United States Patent [19]
Hirokane et al.

[11] Patent Number: 5,825,723
[45] Date of Patent: Oct. 20, 1998

[54] MAGNETO-OPTICAL RECORDING MEDIUM HAVING A REPRODUCING LAYER WITH DIFFERENT MAGNETIZATION DIRECTIONS IN DIFFERENT TEMPERATURE RANGES

[75] Inventors: Junji Hirokane, Nara; Junichiro Nakayama, Shiki-gun; Akira Takahashi, Nara, all of Japan

[73] Assignee: Sharp Kabushiki Kaisha, Osaka, Japan

[21] Appl. No.: 685,534

[22] Filed: Jul. 24, 1996

[30] Foreign Application Priority Data

Sep. 12, 1995 [JP] Japan ................................... 7-234139

[51] Int. Cl.$^6$ ................................................ G11B 11/00
[52] U.S. Cl. ....................................... 369/13; 428/694 EC
[58] Field of Search ................................. 369/13, 275.1, 369/275.2, 275.3, 59, 116, 121, 122, 124, 112, 110, 288; 360/114, 59; 428/694 ML, 694 EC, 694 MM, 694 RE; 365/122

[56] References Cited

U.S. PATENT DOCUMENTS

| | | | |
|---|---|---|---|
| 5,640,374 | 6/1997 | Hirokane et al. | 369/13 |
| 5,648,162 | 7/1997 | Hirokane et al. | 428/332 |
| 5,659,537 | 8/1997 | Hirokane et al. | 369/275.2 |

OTHER PUBLICATIONS

"MSR Disks with Three Magnetic Layers Using In–Plane Magnetization Films" (N. Nishimura et al., The Moris'94, 29–K–04, p. 125).

"Magnetically–Induced Super Resolution Using Magneto–Static Coupling" (K. Tamanoi et al., the Moris'94, 29–K–05, p. 126).

"New Readout Technique Using Domain Collapse On Magnetic Multilayer" (H. Miyamoto et al., The Moris'94, 29–K–06, p. 127).

*Primary Examiner*—Ali Neyzari
*Attorney, Agent, or Firm*—David G. Conlin; Brian L. Michaelis

[57] ABSTRACT

A non-magnetic intermediate layer for intercepting magnetic exchange interaction is provided between a recording layer and a reproducing layer which are composed of a magnetic thin film with perpendicular magnetization. At this time, the reproducing layer is formed so that when an external magnetic field is applied thereto in reproducing information, its magnetization direction is arranged in the direction of the external magnetic field in a first temperature range, and when a light beam for reproduction is projected thereto and the reproducing layer is in a second temperature, the magnetization direction is arranged in the direction of a leakage magnetic flux generated from the recording layer, and is again arranged in the direction of the external magnetic field in a third temperature range. As a result, a rise and a fall of a reproducing signal detected from the reproducing layer can be made sharp, thereby achieving recording and reproducing at high density.

17 Claims, 12 Drawing Sheets

MAGNETO-OPTICAL RECORDING MEDIUM HAVING A REPRODUCING LAYER WITH DIFFERENT MAGNETIZATION DIRECTIONS IN DIFFERENT TEMPERATURE RANGES

FIELD OF THE INVENTION

The present invention relates to a magneto-optical recording medium such as a magneto-optical disk, a magneto-optical tape and a magneto-optical card, for use in a magneto-optical recording and reproducing apparatus, and relates to the method of reproducing from the same.

BACKGROUND OF THE INVENTION

Conventionally, a magneto-optical medium has been used as a rewritable optical recording medium in its practical application. Such magneto-optical recording medium has a drawback in that when a recording bit diameter and an interval between the recording bits which are recording magnetic domains are smaller with respect to a diameter of the light beam from a semiconductor laser converged on the magneto-optical recording medium, reproducing characteristics are deteriorated.

The described problem is caused by the following reason. As the adjoining recording bits also fall within the diameter of spot of the laser beam on the target recording bit, it is not possible to reproduce each recording bit separately.

In order to counteract the above-mentioned problem, several presentations have been made on magneto-optical reproducing technique utilizing a magnetic superresolution phenomenon in the MORIS'94. The No. 29-K-04 "MSR Disks with Three Magnetic Layers Using In-Plane Magnetization Films" (p. 125) and the No. 29-K-05 "Magnetically-induced Super Resolution Using Magneto Static Coupling" (p. 126) of the above-mentioned presentation disclose a magneto-optical recording medium arranged by providing an intermediate layer having an in-plane magnetization or a non-magnetic intermediate layer between a reproducing layer and a recording layer having an in-plane magnetization at room temperature, in which a transition occurs to perpendicular magnetization at a higher temperature.

As a result, a front mask and a rear mask having in-plane magnetization are formed, and it is shown that a reproducing signal changes sharply by the rear mask.

In addition, No. 29-K-06 "New Readout Technique using Domain Collapse on Magnetic Multilayer" (p. 127) discloses that a satisfactory jitter characteristic can be achieved by the sudden change in signal due to the rear mask, and that a position of a recording bit can be detected accurately by differentiating the reproducing signal.

In addition, we have suggested another magneto-optical reproducing technique using a magnetic superresolution phenomenon (date of application: Dec. 27, 1994, title of the invention: "MAGNETO-OPTICAL RECORDING MEDIUM AND METHOD OF REPRODUCING FROM SAME", Japanese Patent Application No. 6-326387/1994 (Tokuganhei 6-326387). FIG. 16 is a schematic constitutional drawing which shows an arrangement of the above-mentioned magneto-optical recording medium. This magneto-optical recording medium is composed of a disk main body 110 including a substrate 101, a transparent dielectric layer 102, a reproducing layer 103, a non-magnetic intermediate layer 109, a recording layer 104, a protective layer 105 and an overcoat layer 106 which are laminated in this order.

The substrate 101 formed in a disk shape is made of a transparent material such as polycarbonate.

The recording layer 104 includes recording bits 111 and 112 for recording therein digital information using perpendicular magnetizations which are antiparallel to each other. The recording bits 111 and 112 are recording-use magnetic domains for recording therein information.

The reproducing layer 103 is formed on the recording layer 104 and includes reproducing bits for transferring thereto the magnetization direction from the recording bits 111 and 112. The reproducing layer 103 has characteristics such that the compensation temperature of a magnetic thin film with perpendicular magnetization is around room temperature. Further, the saturation magnetization in the reproducing layer 103 is maximized in response to a temperature rise at around the reproducing temperature. Moreover, the reduced amount of the coercive force in a process of rising from room temperature to the reproducing temperature is smaller than the increased amount of the saturation magnetization. More specifically, the width of the stable magnetic domain in the reproducing bit becomes larger than the width 104a of the magnetic domain of the recording bits 111 and 112 at room temperature. When the temperature of the recording bit is raised up to the reproducing temperature by projecting a light beam 108 for detecting the magnetization direction of the reproducing bit, the width of the stable magnetic domain is gradually reduced and becomes smaller than the width 104a of the magnetic domain.

The non-magnetic intermediate layer 109 is formed between the recording layer 104 and the reproducing layer 103, for intercepting the exchange interaction, i.e., the magnetic coupling force exerted between the recording layer 104 and the reproducing layer 103. The exchange interaction determines the relative direction of the magnetic moment of two magnetic ions, i.e., the spin.

In the above arrangement, since the width of the stable magnetic domain of the reproducing bit in the reproducing layer 103 is larger than the width of the magnetic domain of the recording bits 111 and 112 at room temperature, it is not possible that the reproducing bit has the same width as the recording bits 111 and 112. Moreover, since the non-magnetic intermediate layer 109 intercepts the exchange interaction exerted between the reproducing layer 103 and the recording layer 104, the magnetization direction of the reproducing bit is prevented from being arranged in the magnetization direction of the recording bit.

When the light beam 108 is converged onto the reproducing layer 103, the same temperature distribution is shown on the reproducing layer 103 and the recording layer 104 in response to the intensity distribution (like Gaussian distribution) of the light beam 108. When the width of the stable magnetic domain of the reproducing bit becomes small according to the temperature rise and thus the reproducing bit having a size corresponding to the recording bit 111 can be stable, a reproducing bit 103a whose magnetization is reversed by a leakage magnetic flux 109a generated from the recording layer 104 is formed. At this time, since the small magnetic coupling force exerts between another recording bit 103b, which is different from the reproducing bit 103a, and the recording layer 104, the reproducing bit 103b is separated from the reproducing bit 103a so that its magnetization direction is arranged in one direction by an external magnetic field, etc.

Therefore, when the reproducing layer 103 is formed as mentioned above, it is possible to reverse the magnetization only on a portion in the area onto which the light beam 108 is projected. As a result, even if the size and the interval of the recording bits 111 and 112 are made smaller than the conventional ones, the reproducing bits can be separated one by one, thereby making it possible to improve recording density of the magneto-optical recording medium.

However, in the magneto-optical recording medium which was presented in MORIS'94, a fall of the reproducing signal becomes sharp by the rear mask formed in reproduction, but a rise of the reproducing signal is gentle in response to the movement of the light beam and the temperature rise similarly to the conventional magneto-optical recording medium. For this reason, in the rising section of the waveform of the reproducing signal, accurate position information cannot be detected, thereby making it impossible to sufficiently achieve higher recording density of the magneto-optical recording medium.

In addition, in the magneto-optical recording medium of Japanese Patent Application No. 6-326387/1994 (Tokuganhei 6-326387), at the time when the temperature of the reproducing layer 103 is raised and thus the width of the stable magnetic domain becomes smaller than the width of the magnetic domain in the recording bits 111 and 112, the reversed magnetic domain is formed on the reproducing layer 103 momentarily. As a result, the rise of the reproducing signal becomes sharp, but since the temperature of the reproducing layer 103 is lowered comparatively mildly, the fall of the reproducing signal becomes mild, thereby making it impossible to sufficiently achieve the higher recording density of the magneto-optical recording medium.

SUMMARY OF THE INVENTION

It is an object of the present invention to provide a magneto-optical recording medium with large capacity for sufficient application to recording image information where a rise and a fall of a reproducing signal are sharp, and to provide a reproducing method which is capable of efficiently reproducing from the magneto-optical recording medium.

In order to achieve the above object, a magneto-optical recording medium of the present invention has:

(1) a recording layer composed of a magnetic thin film with perpendicular magnetization, on which information is recorded in the perpendicular magnetization direction, the recording layer for generating a leakage magnetic flux;

(2) a reproducing layer composed of a magnetic thin film with perpendicular magnetization, to which information about a magnetic domain of the recording layer is transferred; and (3) an intermediate layer composed of a non-magnetic film, the intermediate layer being formed between the recording layer and the reproducing layer, the intermediate layer for intercepting a magnetic exchange coupling force exerted between the recording layer and the reproducing layer. Moreover, (4) the reproducing layer is formed so that when an external magnetic field is applied to the reproducing layer in reproducing information, magnetization direction of the reproducing layer is arranged in the direction of the external magnetic field in a first temperature range including room temperature, and the magnetization direction is arranged in the direction of the leakage magnetic flux in a second temperature range which includes the highest temperature in the first temperature range by projecting a light beam thereto, and the magnetization direction is again arranged in the direction of the external magnetic field in a third temperature range which includes the highest temperature in the second temperature range.

In accordance with the above arrangement, the intermediate layer composed of a non-magnetic film is formed between the recording layer and the reproducing layer which are composed of a magnetic thin film with perpendicular magnetization, and thus the magnetic exchange coupling force is not exerted between the recording layer and the reproducing layer. As a result, the magnetization direction of the reproducing layer is controlled by the leakage magnetic flux generated from the recording layer and the external magnetic field applied from the outside.

At this time, the reproducing layer is foormed so that when the external magnetic field with fixed strength is applied thereto in reproducing information, the magnetization direction is arranged in the direction of the external magnetic field in the first and third temperature ranges, and the magnetization direction is arranged in the direction of the leakage magnetic f lux in the second temperature range between the first and third temperature ranges achieved by projecting a light beam. For this reason, the information about a magnetic domain of the recording layer is not transferred to the reproducing layer in the first temperature range where the light beam is not projected, and thus a reproducing output does not exist. On the other hand, in the second temperature range where the temperature rises due to the light beam, the information about a magnetic domain of the recording layer is transferred to the reproducing layer, and thus a reproducing output is obtained. Moreover, in the third temperature range where the temperature further rises, the information about a magnetic domain transferred to the reproducing layer is collapsed.

Namely, since a temperature distribution of the light beam obey s a Gaussian distribution, only the information about a magnetic domain as one portion of the recording layer to which the light beam is projected and thus is in the second temperature range, is transferred to the reproducing layer, thereby reproducing the information.

In addition, in order to achieve the above object, the magneto-optical recording medium of the present invention may be arranged so as to have (5) an intermediate layer composed of an in-plane magnetization film, provided between the recording layer and the reproducing layer, the intermediate layer for controlling the magnetic exchange coupling force exerted between the recording layer and the reproducing layer, instead of the intermediate layer (3).

In accordance with the above arrangement, the intermediate layer composed of an in-plane magnetization film is formed between the recording layer and the reproducing layer which are composed of a magnetic thin film with perpendicular magnetization so that the magnetic exchange coupling force between the recording layer and the reproducing layer is substantially weakened. As a result, the magnetization direction of the reproducing layer is controlled by the leakage magnetic flux generated from the recording layer and the external magnetic field applied from the outside.

At this time, the reproducing layer is formed so that when the external magnetic field with fixed strength is applied thereto in reproducing information, the magnetization direction is arranged in the direction of the external magnetic field in the first and third temperature ranges, and the magnetization direction is arranged in the direction of the leakage magnetic flux in the second temperature range between the first and third temperature ranges achieved by projecting a light beam. Therefore, similarly to the arrangement (3), it is possible to transfer the information about a magnetic domain as one portion of the recording layer which is in the second temperature range where the temperature rises due to the projection of the light beam and possible to reproduce the information.

In accordance with the above arrangement, the superresolution operation for reproducing the information recorded in a domain which is smaller than a light beam spot can be performed. As a result, the high density recording which is required for a large capacity can be sufficiently achieved, thereby making it possible to realize a magneto-optical recording medium which can record image information, etc. requiring a recording and reproducing apparatus with a large capacity.

A method of reproducing the magneto-optical recording medium having the above two arrangements, is characterized by including:

the step of raising a temperature of the reproducing layer to the second temperature range by projecting a light beam thereto with the external magnetic field being applied thereto, strength of the external magnetic field being set so as to be stronger than strength of the leakage magnetic flux generated from the recording layer in the first temperature range and be weaker than the strength of the leakage magnetic flux in the second temperature range and again be stronger than the strength of the leakage magnetic flux in the third temperature range;

the step of transferring the information about a magnetic domain of the recording layer to the reproducing layer which is in the second temperature range; and the step of detecting a reproducing signal for reproducing the information about a magnetic domain by the light beam.

In accordance with the above method, when the light beam is projected to the magneto-optical recording medium with the external magnetic field being applied, in the first and third temperature ranges, the magnetization direction of the reproducing layer is arranged in the direction of the external magnetic field, and in the second temperature range, the magnetization direction of the reproducing layer is arranged in the direction of the leakage magnetic flux.

Namely, the information about a magnetic domain of the recording layer is transferred to only a portion of the reproducing layer where its temperature rises to the second temperature range. As a result, the reproducing signal for reproducing the information with the light beam can be stably detected. In this case, the magnetic domain of the reproducing layer is instantaneously generated during the process of changing from the first temperature range to the second temperature range and magnetic domain of the reproducing layer is instantaneously collapsed during the process of changing from the second temperature range to the third temperature range. As a result, a waveform of an obtained reproducing signal has a rectangular shape which shows a sharp rise and fall. Therefore, the edge position of the recording magnetic domain can be accurately detected by utilizing the rise and fall of the reproducing signal. As a result, the high density recording required for a larger capacity can be sufficiently achieved, thereby making it possible to realize a magneto-optical recording medium which can record image information, etc. requiring a recording and reproducing apparatus with a large capacity.

In addition, a method of reproducing from the magneto-optical recording medium may include the step of differentiating the reproducing signal.

In accordance with the above method, since the reproducing signal for reproducing information is differentiated, the sharp rise and fall of the reproducing signal becomes sharper. As a result, a position of the recording magnetic domain or an edge of the recording magnetic domain can be detected more accurately. Therefore, even if the recording density is made higher by making the recording magnetic domain smaller, information recorded in the recording magnetic domain can be reproduced. As a result, the reproduction from a magneto-optical recording medium having a larger capacity can be realized.

For fuller understanding of the nature and advantages of the invention, reference should be made to the ensuing detailed description taken in conjunction with the accompanying drawings.

DETAILED DESCRIPTION OF THE PREFERRED EMBODIMENTS

[FIRST EMBODIMENT]

The following describes embodiment of the present invention on reference to FIGS. 1 through 12. The present embodiment explains the case where a magneto-optical disk is used as a magneto-optical recording medium.

Figure 2:
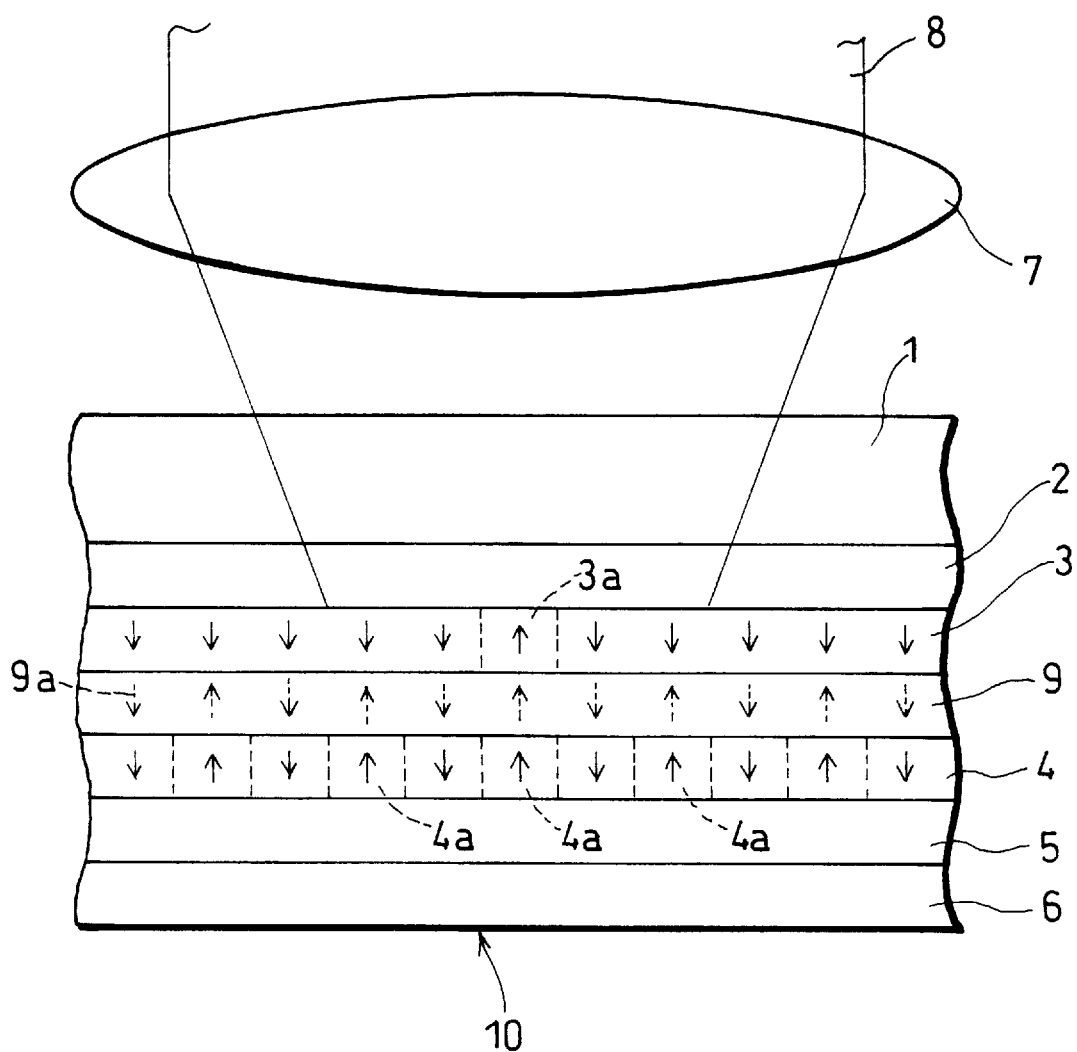
FIG. 2 is an explanatory drawing which shows an arrangement of the above magneto-optical disk.

As shown in FIG. 2, the magneto-optical disk according to the present embodiment is composed of a disk main body 10 including a substrate 1, a transparent dielectric layer 2, a reproducing layer 3, a non-magnetic intermediate layer (intermediate layer) 9, a recording layer 4, a protective layer 5 and an overcoat layer 6 which are laminated in this order.

In such magneto-optical disk which adopts the recording system based upon Curie temperature, a light beam 8 emitted from a semiconductor laser is converged onto the reproducing layer 3 by an objective lens 7, and thus information is recorded and reproduced by the magneto-optical effect which is known as the polar Kerr effect. The polar Kerr effect is a phenomenon such that a polarization plane of reflected light rotates in a reverse direction according to the magnetization direction in the magnetic layer having a magnetization in a direction perpendicular to a light incident surface.

The substrate 1 formed in a disk shape is made of a transparent material such as polycarbonate.

The recording layer 4 is a magnetic thin film with perpendicular magnetization made of rare earth-transition metal alloy where compensation temperature is around room temperature. The recording layer 4 includes a recording magnetic domain 4a for recording therein digital information by perpendicular magnetizations which are mutually antiparallel.

Figure 3:
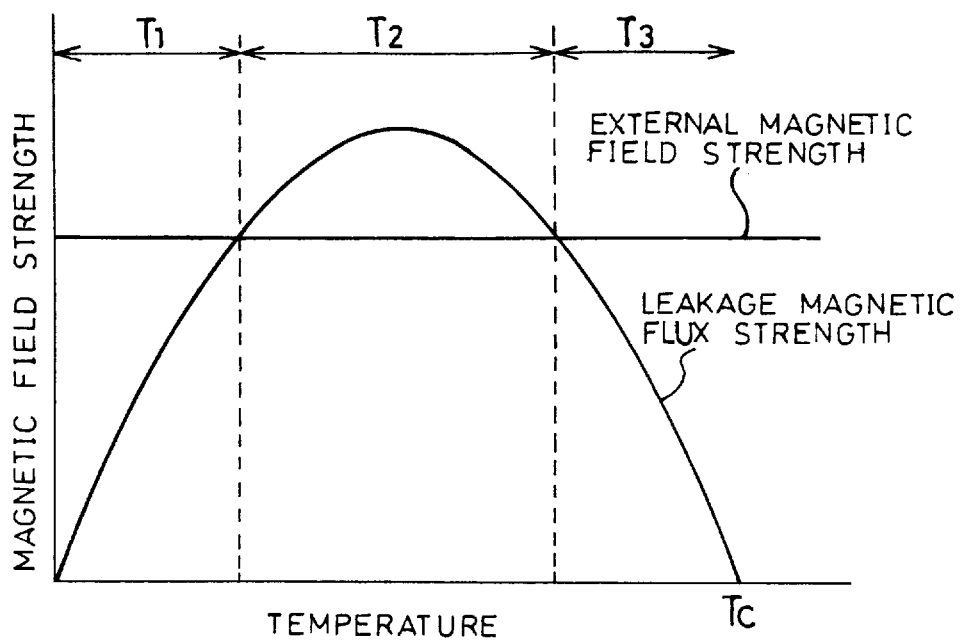
FIG. 3 is a graph which shows a magnetic characteristic of a leakage magnetic flux generated from the magneto-optical disk and an external magnetic field with constant intensity which is applied in the process of reproducing.

In addition, an amount of the magnetization in the recording layer 4 is comparatively small in a vicinity of room temperature, and it is increased as the temperature rises. Then, after the amount of the magnetization takes a certain maximum value, the amount is reduced and becomes 0 at Curie temperature Tc. Therefore, the strength of a leakage magnetic flux 9a generated from the recording layer 4 is also changed as shown in FIG. 3 according to the amount of the magnetization in the recording layer 4. In other words, in the first temperature range $T_1$ including room temperature, the leakage magnetic flux strength is increased according to the rise of temperature, and in the second temperature range $T_2$ which is reproducing temperature, the strength has a maximum value. Moreover, in the third temperature range $T_3$, the strength is reduced according to the rise of temperature, and at Curie temperature Tc, the strength becomes 0. The amount of the magnetization in the recording layer 4 is represented by 4 πMs by using the saturation magnetization Ms in the recording layer 4.

The reproducing layer 3 which is a magnetic thin film with perpendicular magnetization made of rare earth-transition metal alloy, is formed on the recording layer 4 as shown in FIG. 2. The reproducing layer 3 includes a reproducing magnetic domain 3a for copying the magnetization direction of the recording magnetic domain 4a thereto by the leakage magnetic flux 9a generated from the recording layer 4.

In addition, in the reproducing layer 3, as the amount of the magnetization is larger, force to arrange the magnetization in the direction of the leakage magnetic flux 9a becomes stronger, so it is desirable that the magnetization of the reproducing layer 3 also becomes maximum in the second temperature range $T_2$. Moreover, it is necessary that the reproducing layer 3 is arranged in the direction of an external magnetic field which is a reproducing magnetic field 11 (see FIG. 7), mentioned later, in the first and third temperature ranges $T_1$ and $T_3$. For this reason, the reproducing layer 3 is formed so as to at least have the magnetization which makes it possible to feel an external magnetic field in the first and third temperature ranges $T_1$ and $T_3$.

Namely, the reproducing layer 3 is formed such that when the external magnetic field with prescribed strength is applied to the reproducing layer 3 in the process of reproducing information, its magnetization direction is arranged in the external magnetic field direction in the first temperature range $T_1$, and when the temperature is in the second temperature range $T_2$ which is higher than the first temperature range $T_1$ by projecting the light beam 8 onto the reproducing layer 3, the magnetization direction is arranged in the direction of the leakage magnetic flux 9a. Furthermore, when the temperature is in the third temperature range $T_3$ which is higher than the second temperature range $T_2$, the magnetization direction is arranged in the direction of the external magnetic field again.

The relationship between the first through third temperature ranges $T_1$ through $T_3$ and the Curie temperature Tc of the recording layer 4 is satisfied as follows:

$$T_1 = \frac{Tc}{3},$$

and $$\frac{Tc}{3} \leq T_2 \leq \frac{2}{3} Tc,$$

and $$\frac{2}{3} Tc < T_3.$$

Namely, the first through third temperature ranges $T_1$ through $T_3$ are determined by the Curie temperature Tc of the recording layer 4. The Curie temperature Tc in the present embodiment is in the range of 200° C. to 300° C. Therefore, when Tc =200° C., $T_1$<67° C. and 67° C. $\leq T_2 \leq$133° C. and 133° C. <$T_3$, and when Tc =300° C., $T_1$<100° C. and 100° C. $\leq T_2 \leq$200° C. and 200° C. <$T_3$.

The non-magnetic intermediate layer 9 is formed between the recording layer 4 and the reproducing layer 3, for intercepting the exchange interaction, i.e., the magnetic coupling force exerted between the recording layer 4 and the reproducing layer 3. The exchange interaction determines the magnetic moment of two magnetic substances, i.e., the relative direction of the spin. As a result, since the magnetic coupling force does not exert between the recording layer 4 and the reproducing layer 3, the magnetization direction of the reproducing layer 3 is controlled by the leakage magnetic flux 9a generated from the recording layer 4 and the external magnetic field to be applied from outside.

In order to reproduce from the magneto-optical disk, it is necessary that the magnetization direction of the reproducing layer 3 and the magnetization direction in the non-recording portion of the recording layer 4 should be arranged in the external magnetic field in the first and third temperature ranges $T_1$ and $T_3$.

Figure 7:
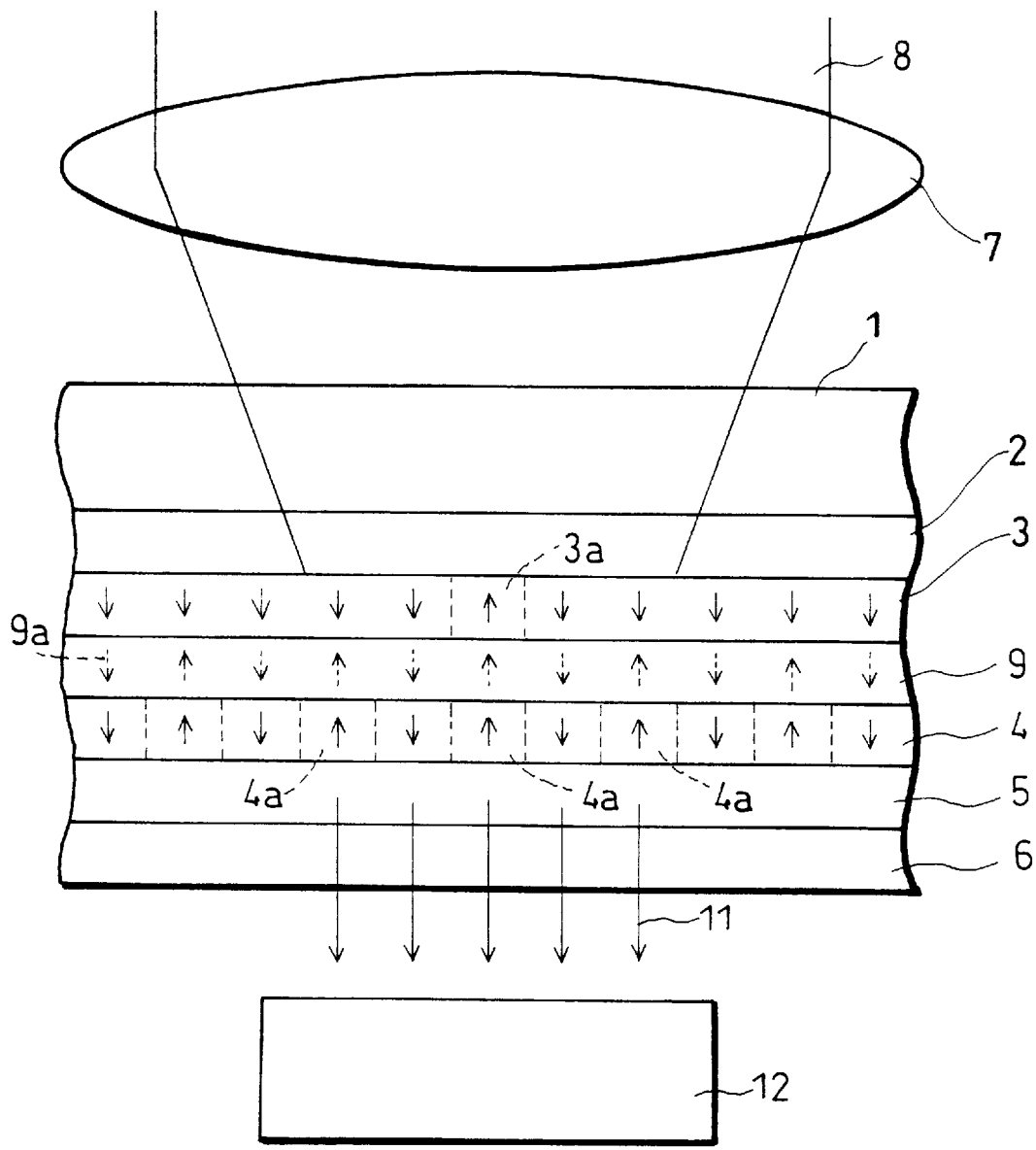
FIG. 7 is an explanatory drawing which shows the arrangement of a magneto-optical disk equipped with an external magnetic field generator for generating an external magnetic field.

For this reason, as shown in FIG. 7, a reproducing magnetic field generating unit 12, which applies a reproducing magnetic field 11 as the external magnetic field with fixed strength simultaneously in the reproduction by the light beam 8, is provided. The reproducing magnetic field 11 prevents the reverse of the magnetization of the recording layer 4 in the first and third temperature ranges $T_1$ and $T_3$, and arranges the magnetization direction of the reproducing layer 3 in one direction by overcoming the leakage magnetic flux 9a generated from the recording layer 4. Moreover, the reproducing magnetic field 11 prevents the reverse of the magnetization of the recording layer 4 in the second temperature range $T_2$, and reverses the magnetization of the reproducing layer 3 in response to the leakage magnetic flux 9a. Namely, the reproducing magnetic field 11 is always weaker than the coercive force of the recording layer 4 in the temperature range (second temperature range $T_2$) where reproduction is performed, and it is stronger than the leakage magnetic flux 9a in the first temperature range $T_1$ and the third temperature range $T_3$. Moreover, the reproducing magnetic field 11 is weaker than the leakage magnetic flux 9a in the second temperature range $T_2$.

If the reproducing magnetic field generating unit 12 for generating the reproducing magnetic field 11 is also used as a unit for generating a recording magnetic field, the reproducing magnetic field 11 can be generated without enlarging the apparatus and raising the cost of the apparatus.

The following describes the reproducing operation using the magneto-optical disk on reference to FIGS. 1(a) through 1(d). The magneto-optical disk is generally arranged so that the recording magnetic domains 4a are formed on the recording layer 4 along a plurality of tracks 1a formed on the substrate 1 accordingly to the recording information, but in order to describe the reproducing characteristic clearly, one recording magnetic domain 4a is supposed to be formed in the description.

Figure 1A:
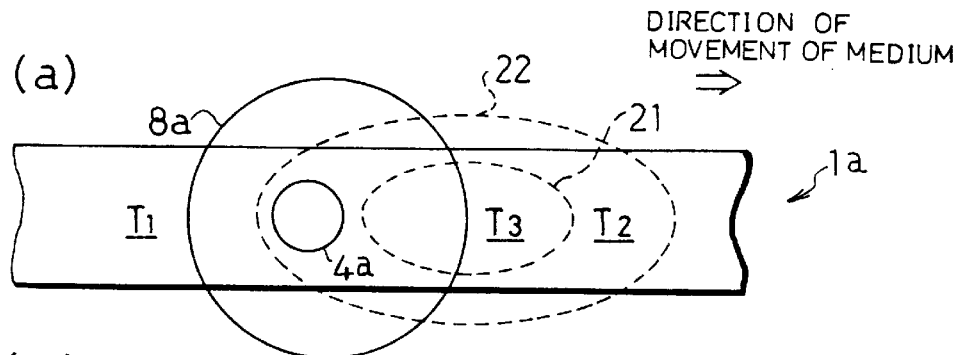
FIG. 1(a) is an explanatory drawing which shows a principle of reproduction from a magneto-optical disk according to embodiment of the present invention and shows a temperature distribution on a track.

FIG. 1(a) is a plan view of the above magneto-optical disk, and here, only one recording magnetic domain 4a, which is transferred to the reproducing layer 3 when reproduction can be performed on the reproducing layer 3, is shown. By the moving of the track 1a (towards right in the drawing) according to the rotation of the magneto-optical disk, a spot 8a of the light beam 8 relatively moves, so a temperature distribution is shown according to the moving speed on the track 1a. The portion of the track 1a with the highest temperature is in the rear of the spot 8a. Namely, an inner area of an isothermal line 21 is in the third temperature range $T_3$ where the temperature is the highest, an area between the isothermal lines 21 and 22 is in the second temperature range $T_2$ and an outer area of the isothermal line 22 is in the first temperature range $T_1$.

Figure 1B:
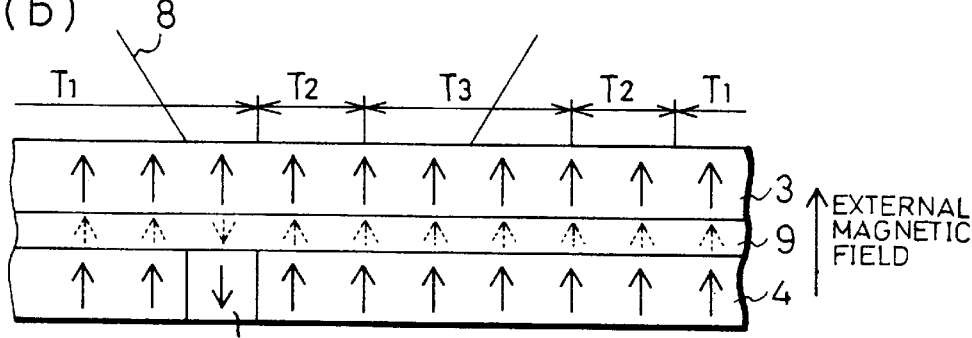
FIG. 1(b) is a cross sectional view which shows a magnetization state when a recording magnetic domain falls in a first temperature range.

FIG. 1(b) shows the magnetization of each layer and the leakage magnetic flux before the spot 8a comes to a position of FIG. 1(a), namely, in the case where the recording magnetic domain 4a exists in the first temperature range $T_1$ where the temperature is lower than that of the isothermal line 22. In this case, since the strength of the leakage magnetic flux generated from the recording layer 4 becomes weaker than the constant external magnetic field strength, the magnetization direction of the reproducing layer 3 is arranged in the direction of the external magnetic field, and the magnetization direction of the recording magnetic domain 4a is not transferred to the reproducing layer 3.

Figure 1C:
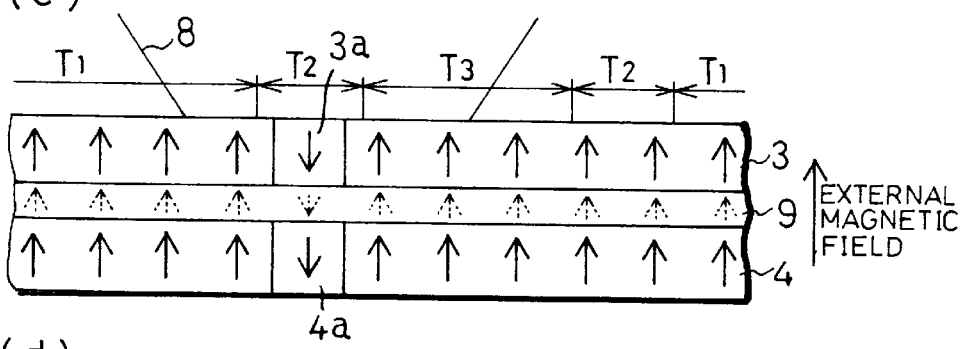
FIG. 1(c) is a cross sectional view which shows the magnetization state when the recording magnetic domain falls in a second temperature range.

Next, FIG. 1(c) shows the magnetization of each layer and the leakage magnetic flux when the spot 8a comes to the position of FIG. 1(a), namely, in the case where the recording magnetic domain 4a is in the second temperature range $T_2$ which is between the isothermal lines 21 and 22. At this time, since the leakage magnetic flux strength becomes stronger than the external magnetic field strength, the magnetization direction of the reproducing layer 3 is arranged in the direction of the leakage magnetic flux, and the magnetization direction of the recording magnetic domain 4a is transferred to the reproducing layer 3 so that a reproducing magnetic domain 3a is created. Thereafter, the information about the magnetic domain on the reproducing layer 3 is detected by the light beam 8 as a reproducing output, and the information is read out.

Figure 1D:
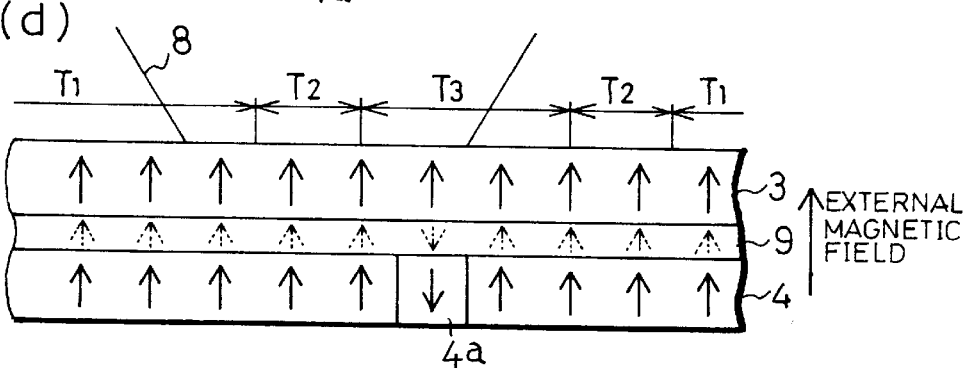
FIG. 1(d) is a cross sectional view which shows the magnetization state when the recording magnetic domain falls in a third temperature range.

Next, FIG. 1(d) shows the magnetization of each layer and the leakage magnetic flux after the spot 8a passes the position of FIG. 1(a), namely, in the case where the recording magnetic domain 4a is in the third temperature range $T_3$ where the temperature is higher than the isothermal line 21. In this case, since the leakage magnetic flux strength becomes weaker than the external magnetic field strength, the magnetization direction of the reproducing layer 3 is arranged in the direction of the external magnetic field, and the reproducing magnetic domain 3a is collapsed.

As mentioned above, since the reproducing layer 3 is formed so that the magnetization direction of the reproducing layer 3 of the magneto-optical disk is arranged in the direction of the leakage magnetic flux generated from the recording layer 4 according to the temperature distribution or towards the direction of the external magnetic field which is applied from the outside, only the recording magnetic domain 4a in the second temperature range $T_2$ which is sufficiently narrower than the diameter of the spot 8a of the light beam 8 is transferred to the reproducing layer 3 so as to be reproduced by the light beam 8. As a result, even if the recording density of the recording layer 4 is improved, it is possible to stably reproduce the information on each recording magnetic domain 4a by the light beam 8. Therefore, since a sufficiently higher recording density required for a larger capacity can be achieved, it is possible to satisfactorily perform recording of image information, etc. which requires a recording and reproducing apparatus with a larger capacity.

In addition, in the present embodiment, when a conversion from the state of FIG. 1(b) to the state of FIG. 1(c) takes place, namely, when the recording magnetic domain 4a moves from the first temperature range $T_1$ to the second temperature range $T_2$, the magnetization is transferred from the recording layer 4 to the reproducing layer 3 at the moment when the transferring condition of the magnetic domain is satisfied for the reproducing layer 3, and a sharp rise of a reproducing signal can be obtained according to the momentary transfer of the magnetic domain on the reproducing layer 3. Meanwhile, when a conversion from the state of FIG. 1(c) to the state of FIG. 1(d) takes place, namely, when the recording magnetic domain 4a moves from the second temperature range $T_2$ to the third temperature range $T_3$, the magnetic domain which was transferred to the reproducing layer 3 is momentarily collapsed at the moment when the transferring condition of the magnetic domain is not satisfied for the reproducing layer 3, and a sharp fall of the reproducing signal can be obtained according to the momentary collapse of the magnetic domain on the reproducing layer 3.

The method of manufacturing the magneto-optical disk having the above-mentioned arrangement will be explained.

Here, a sample of the magneto-optical disk manufactured is referred to as a disk A.

In the sputtering device provided with targets of Al, GdFeCo alloy and DyFeCo alloy, the substrate 1 formed in a disk shape made of polycarbonate having formed thereon pregroove and prepit was placed on a substrate holder. After air was exhausted from the sputtering device to $1\times10^{-6}$ Torr, mixed gas of argon and nitrogen was introduced therein, and an electric power was supplied to the Al target, and under the gas pressure of $4\times10^{-3}$ Torr, the transparent dielectric layer 2 made of AlN was formed on the substrate 1.

In order to improve a reproducing characteristic, the film thickness of the transparent dielectric layer 2 is set to a value obtained by dividing ¼ of the wavelength of the reproducing light by the refractive index of the transparent dielectric layer 2. For example, when the reproducing light with a wavelength of 680 nm is used, the transparent dielectric layer 2 may have the thickness in a range of 10 nm to 80 nm. In the present embodiment, the transparent dielectric layer 2 having a thickness of 50 nm was adopted.

Next, again, air was exhausted from the sputtering device to $1\times10^{-6}$ Torr, and argon gas was introduced therein. Then an electric power was supplied to the GdFeCo alloy target, and under the gas pressure of $4\times10^{-3}$ Torr, the reproducing layer 3 made of $Gd_{0.20}(Fe_{0.80}Co_{0.20})_{0.80}$ was formed on the transparent dielectric layer 2. The compensation temperature of the producing layer 3 was in a vicinity of room temperature, and Curie temperature thereof was 280° C.

It is preferable that the reproducing layer 3 has a thickness of not less than 10 nm because with this thickness, the magnetization information recorded on the recording layer 4 is prevented from being outputted as a signal. Moreover, if the reproducing layer 3 becomes too thick, the larger laser power of the light beam 8 is required for raising the temperature, which would cause the recording sensitivity to drop. For this reason, it is preferable that the reproducing layer 3 has a thickness of not more than 50 nm. In the present embodiment, the reproducing layer 3 having a thickness of 40 nm was adopted.

Next, mixed gas of argon and nitrogen was introduced into the sputtering device, an electric power was supplied to the Al target, and under the gas pressure of $4\times10^{-3}$ Torr, the non-magnetic intermediate layer 9 made of AlN was formed on the reproducing layer 3. It is preferable that the non-magnetic intermediate layer 9 has a thickness of not more than 60 nm in order to effectively transmit the leakage magnetic flux generated from the recording layer 4 to the reproducing layer 3. It is also preferable that the non-magnetic intermediate layer 9 has a thickness of not less than 1 nm in order to prevent a magnetic exchange coupling force to be exerted directly between the reproducing layer 3 and the recording layer 4. In the present embodiment, the non-magnetic intermediate layer 9 with a thickness of 5 nm was adopted.

Next, again, after air was exhausted from the sputtering device to $1\times10^{-6}$ Torr, argon gas was introduced therein, and an electric power was supplied to the DyFeCo alloy target, and under the gas pressure of $4\times10^{-3}$ Torr, the recording layer 4 made of $Dy_{0.23}(Fe_{0.70}Co_{0.30})_{0.77}$ was formed on the non-magnetic intermediate layer 9. The recording layer 4 is composed of a magnetic thin film with perpendicular magnetization. The compensation temperature of the recording layer 4 was in a vicinity of room temperature and Curie temperature thereof was 275° C.

It is preferable that the recording layer 4 has a thickness of not less than 20 nm in order to generate a leakage magnetic flux required for reversing the magnetization of the reproducing magnetic domain of the reproducing layer 3. On the other hand, if the recording layer 4 becomes too thick, a larger laser power of the light beam 8 is required for raising the temperature, which would cause the recording sensitivity to drop. Therefore, it is preferable that the recording layer 4 has a thickness of not more than 200 nm. In the present embodiment, the recording layer 4 having a thickness of 40 nm was adopted.

Next, mixed gas of argon and nitrogen was introduced into the sputtering device, and an electric power was supplied to the Al target, thereby forming the protective layer 5 made of AlN on the recording layer 4 under the same condition of forming the transparent dielectric layer 2.

The thickness of the protective layer 5 is not limited as long as it can protect the recording layer 4 against corrosion such as oxidation. It is preferable that the protective layer 5 has a thickness of not less than 5 nm. In the present embodiment, the protective layer 5 having a thickness of 20 nm was adopted.

Next, an ultraviolet ray hardening resin or a thermosetting resin was applied to the protective layer 5 by spin-coating, and the ultraviolet ray was projected or heat was applied thereto so that the overcoat layer 6 was formed on the protective layer 5.

Figure 4:
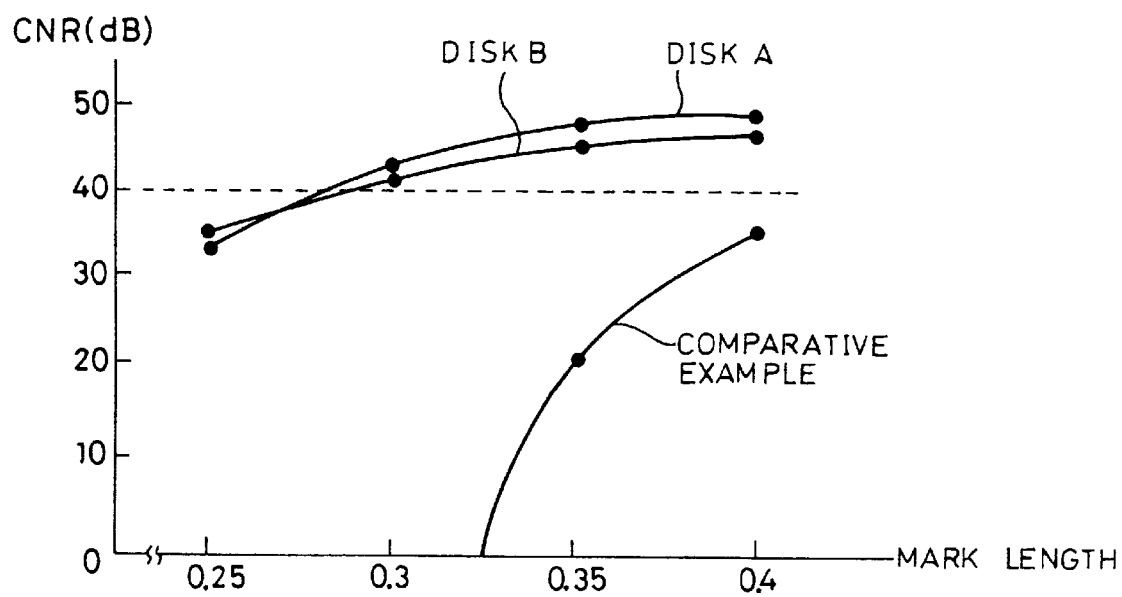
FIG. 4 is a graph which shows a reproducing characteristic of the magneto-optical disk.

FIG. 4 shows a mark length dependency of the CNR (carrier to noise ratio) in the disk A. After arranging the magnetization direction of the reproducing layer 3 in the initializing direction of the recording layer 4, the light beam 8 with a laser power of 6 mW was projected onto the surface of the disk at a linear velocity of 5 m/s, under a recording magnetic field of 10 kA/m, and after forming the recording magnetic domains 4a with a different mark length at a pitch of double the mark length pitch, the CNR was measured by the reproducing laser power of 2 mW with the external magnetic field of 5 kA/m being applied to the disk A.

According to FIG. 4, a CNR of not less than 40 dB can be obtained in the recording magnetic domain 4a having a mark length of 0.3μm and a mark pitch of 0.6 μm.

In the measurement of the CNR of the present invention, an optical system using a laser beam with a wavelength of 830 nm is adopted. When such a laser beam is used, it is known that the recording magnetic domain to be reproduced and the adjoining recording magnetic domain cannot be separated completely with respect to the normally recorded recording magnetic domain with a mark length of 0.3μm and a mark pitch of 0.6μm. Namely, in the case of reproducing the normally recorded recording magnetic domain with a mark length of 0.3μm and a mark pitch of 0.6μm by using a laser beam of 830 nm, the CNR becomes 0.

For this reason, in accordance with the arrangement of the present embodiment, in the case of reproducing using the laser beam of 830 nm, a large CNR is obtained. Therefore, it can be seen that the magnetic superresolution phenomenon is achieved at the time of the reproduction.

For comparison, FIG. 4 shows a result of evaluating an usual magneto-optical disk which does not utilize the magnetic superresolution phenomenon by the same optical system.

Figure 5:
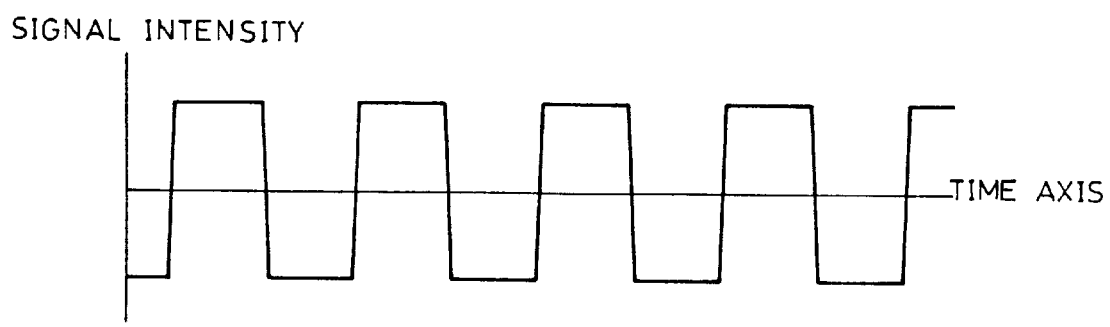
FIG. 5 is a waveform chart which shows a waveform of the reproducing signal in the magneto-optical disk.

In addition, FIG. 5 shows a waveform of a reproducing signal obtained from the recording magnetic domain with a mark length of 0.3μm and a mark pitch of 0.6μm in the disk A. According to the drawing, the reproducing waveform shows that the rise and fall of the reproducing signal are sharp. As a result, as mentioned above, when the reproducing laser power of the light beam 8 rises, the temperature distribution of FIG. 1 is shown, and the reproducing magnetic domain is momentarily generated and collapsed on the reproducing layer 3, thereby making it possible to obtain the reproducing waveform with such sharp rise and fall.

Figure 6:
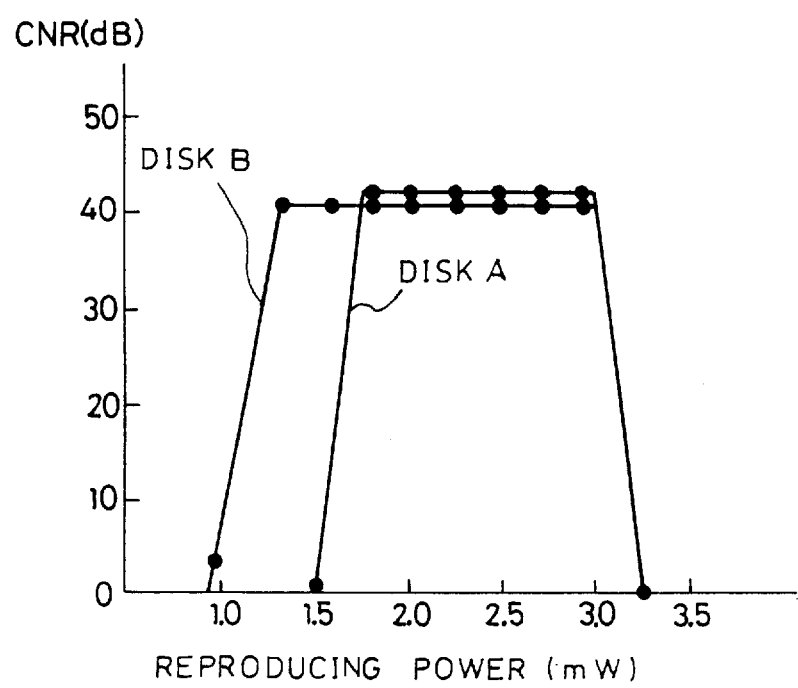
FIG. 6 is a graph which shows the reproducing characteristic of the magneto-optical disk.

Next, in order to see the reproducing power dependency of CNR, the CNR was measured with a varying power of the reproducing power of the light beam 8 with respect to the recording magnetic domain 4a with a mark length of 0.3 μm and a mark pitch of 0.6 μm. The results are shown in FIG. 6.

According to the drawing, it can be seen that when the reproducing power of the light beam 8 is about 1.5 mW, the CNR suddenly increases. This is because the temperature distribution of FIG. 1 is shown on the reproducing layer 3 with the rise of the reproducing power, and the reproducing magnetic domain is momentarily generated and collapsed on the reproducing layer 3.

When the reproducing power further increases, the CNR suddenly drops. This is because the temperature of the recording layer 4 rises to a vicinity of Curie temperature Tc, and thus magnetization information recorded on the recording layer 4 is changed.

Therefore, when adopting the magneto-optical disk of the present embodiment, the reproducing power of the light beam 8 is set higher than that required for generating and collapsing the reproducing magnetic domain, and lower than that which makes it impossible to transfer the recording magnetic domain satisfactorily. With the above-mentioned setting of the reproducing power, a signal can be reproduced satisfactorily.

Next, with varying film thicknesses of the reproducing layer 3, the non-magnetic intermediate layer 9 and the recording layer 4, the respective CNRs with respect to the recording magnetic domain 4a with a mark length of 0.3μm and a mark pitch of 0.6μm were measured. The results are shown in Table 1.

TABLE 1

| Thickness of Reproducing Layer (nm) | Thickness of Intermediate Layer (nm) | Thickness of Recording Layer (nm) | CNR (dB) | Reproducing Characteristic |
|---|---|---|---|---|
| 5 | 5 | 40 | 12 | ◯ |
| 10 | 5 | 40 | 35 | ◯ |
| 20 | 5 | 40 | 38 | ◯ |
| 30 | 5 | 40 | 41 | ◯ |
| 40 | 5 | 40 | 43 | ◯ |
| 50 | 5 | 40 | 39 | ◯ |
| 60 | 5 | 40 | 37 | ◯ |
| 40 | 1 | 40 | 39 | ◯ |
| 40 | 2 | 40 | 40 | ◯ |
| 40 | 5 | 40 | 43 | ◯ |
| 40 | 10 | 40 | 42 | ◯ |
| 40 | 20 | 40 | 39 | ◯ |
| 40 | 40 | 40 | 37 | ◯ |
| 40 | 60 | 40 | 30 | ◯ |
| 40 | 5 | 5 | 20 | ◯ |
| 40 | 5 | 10 | 25 | ◯ |
| 40 | 5 | 20 | 35 | ◯ |
| 40 | 5 | 30 | 39 | ◯ |
| 40 | 5 | 40 | 43 | ◯ |
| 40 | 5 | 60 | 43 | ◯ |
| 40 | 5 | 80 | 43 | ◯ |
| 40 | 5 | 120 | 41 | ◯ |

Here, the CNRs were measured by the optical system using a laser beam having a wavelength of 830 nm, and some value for the CNR is obtained with respect to the recording magnetic domain 4a having a mark length of 0.3 μm and a mark pitch of 0.6 μm. This proves that the magnetic superresolution phenomenon is shown by the arrangement of the present invention as in the previous case. In Table 1, the magneto-optical disks from which the rectangular reproducing waveforms which ares similar to the reproducing waveform shown in FIG. 5 are obtained, are marked "◯" under the column of the reproducing characteristic.

According to Table 1, in the range of film thickness adopted in the experiment, although the obtained CNRs are not identical, the magnetic superresolution phenomenon of the present invention is confirmed with respect to all the magneto-optical disks.

As a result, when the magneto-optical disk has the reproducing layer 3 with a thickness in a range of 5 nm to 60 nm, the excellent reproducing characteristic is obtained, but it is preferable that the reproducing layer 3 has a thickness in a range of 10 nm to 50 nm for the reason mentioned in the method of manufacturing magneto-optical disk. It is more preferable that the reproducing layer 3 has a thickness in a range of 30 nm to 40 nm, which obtains the CNR of not less than 40 dB. It is preferable that the non-magnetic intermediate layer 9 has a thickness in a range of 1 nm to 60 nm, and more preferable that it has a thickness in a range of 2 nm to 10 nm, which obtains the CNR of not less than 40 dB. Furthermore, it is preferable that the recording layer 4 has a thickness in a range of 5 nm to 120 nm, and more preferable that it has a thickness in a range of 40 nm to 120 nm, which obtains the CNR of not less than 40 dB.

Next, with varying the composition of the reproducing layer 3, the CNRs with respect to the recording magnetic domain 4a with a mark length of 0.3 μm and a mark pitch of 0.6 μm were measured, and the results are shown in Table 2. In Table 2, $X_1$ and $Y_1$ represents a composition ratio of $Gd_{X_1}(Fe_{Y_1}Co_{1-Y_1})_{1-X_1}$ in the reproducing layer 3.

TABLE 2

| $X_1$ | $Y_1$ | CNR (dB) | Reproducing Characteristic |
|---|---|---|---|
| 0.12 | 0.80 | 0 | — |
| 0.16 | 0.80 | 31.2 | ◯ |
| 0.20 | 0.80 | 43.0 | ◯ |
| 0.22 | 0.80 | 38.2 | ◯ |
| 0.24 | 0.80 | 0 | — |
| 0.20 | 0.66 | 0 | — |
| 0.20 | 0.74 | 22.5 | ◯ |
| 0.20 | 0.80 | 43.0 | ◯ |
| 0.20 | 0.86 | 40.0 | ◯ |
| 0.20 | 0.90 | 35.5 | ◯ |
| 0.20 | 1.00 | 22.4 | ◯ |

In the measurement of the CNR, an optical system using a laser beam with a wavelength of 830 nm was adopted. As is clear from the results shown in Table 2, some value for the CNR was obtained with respect to the recording magnetic domain 4a which was normally recorded with a mark length of 0.3 μm and a mark pitch of 0.6 μm. This proves that the magnetic superresolution phenomenon is shown by the arrangement of the present invention as in the aforementioned case. In Table 2, the magneto-optical disks from which the rectangular reproducing waveforms which are similar to the reproducing waveform shown in FIG. 5 were obtained, are marked "◯" under the column of the reproducing characteristic.

According to Table 2, in the present invention, $Gd_{X_1}(Fe_{Y_1}Co_{1-Y_1})_{1-X_1}$ of the reproducing layer 3 is required to satisfy the following condition: With a given $Y_1=0.80$, $0.16 \leq X_1 \leq 0.22$. This is because when $X_1$ becomes smaller than 0.16, a micro-magnetic domain of the reproducing layer 3 exists stably at room temperature, and the magnetization information of the recording layer 4 is transferred to the reproducing layer 3 in the first temperature range $T_1$, thereby making it impossible to realize the superresolution operation of the present invention. Moreover, when $X_1$ becomes larger than 0.22, the micro-magnetic domain of the reproducing layer 3 becomes unstable in the range of reproducing temperature, namely, in the second temperature range $T_2$, and thus the magnetic domain is not transferred to the reproducing layer 3 in the second temperature range $T_2$, thereby making it impossible to realize the superresolution operation of the present invention.

In addition, the reproducing layer 3 is required to satisfy the following condition: With a given $X_1=0.20$, $0.74 \leq Y_1 \leq 1.00$. Under the condition of $Y_1 < 0.74$, when content of Co is increased, the magnetization of the reproducing layer 3 is greatly changed. In the first temperature range $T_1$ and the third temperature range $T_3$, it is hard to arrange the magnetizations direction of the reproducing layer 3 in one direction by the identical external magnetic field.

Next, with varying the composition of the recording layer 4, the CNRs with respect to the recording magnetic domain 4a having a mark length of 0.3 μm and a mark pitch of 0.6 μm were measured, and the results are shown in Table 3. In Table 3, $X_2$ and $Y_2$ represent the composition ratio of $Dy_{X2}(Fe_{Y2} Co_{1-Y2})_{1-X2}$ of the recording layer 4.

TABLE 3

| $X_2$ | $Y_2$ | CNR (dB) | Reproducing Characteristic |
|---|---|---|---|
| 0.16 | 0.70 | 0 | — |
| 0.18 | 0.70 | 31.2 | ◯ |
| 0.23 | 0.70 | 43.0 | ◯ |
| 0.25 | 0.70 | 38.2 | ◯ |
| 0.27 | 0.70 | 0 | — |
| 0.23 | 0.50 | 0 | — |
| 0.23 | 0.66 | 23.5 | ◯ |
| 0.23 | 0.70 | 43.0 | ◯ |
| 0.23 | 0.80 | 38.0 | ◯ |
| 0.23 | 0.85 | 27.9 | ◯ |
| 0.23 | 0.90 | 0 | — |

In Table 3, the magneto-optical disks from which the rectangular reproducing waveforms which are similar to the reproducing waveform shown in FIG. 5 were obtained, are marked "O" under the column of the reproducing characteristic.

According to Table 3, $Dy_{X2}(Fe_{Y2} Co_{1-Y2})_{1-X2}$ of the recording layer 4 is required to satisfy the following condition: With a given $Y_2=0.70$, $0.18 \leq X_2 \leq 0.25$, and with a given $X_2=0.23$, $0.66 \leq Y_2 \leq 0.85$. This is because when $X_2$ and $Y_2$ are out of the above composition ranges, the strength of the leakage magnetic flux shown in FIG. 4 generated from the recording layer 4 cannot be obtained, thereby making it impossible to realize the superresolution operation.

Figure 8:
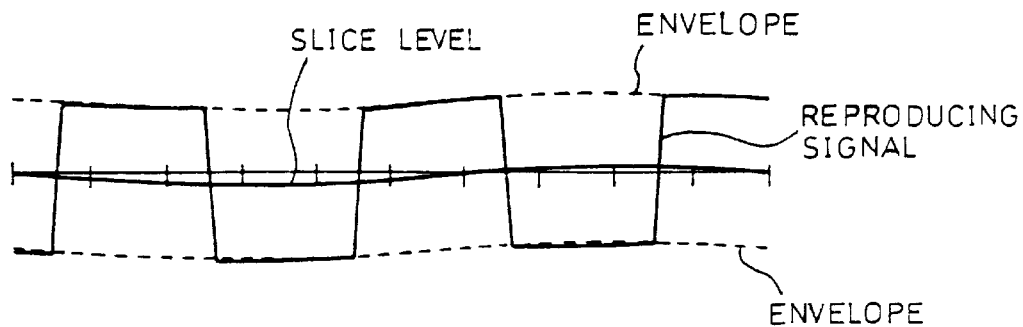
FIG. 8 is a waveform chart which shows a waveform of a reproducing signal in the above magneto-optical disk.

As mentioned above, the reproducing signal to be detected in the magneto-optical disk has the characteristic that its rise and fall are extremely sharp. For example, in the case where the recording magnetic domain 4a having a pitch of 0.8 μm and a diameter of 0.4 μm is formed in the magneto-optical disk, the waveform of the signal outputted in reproducing is shown in FIG. 8.

Figure 9:
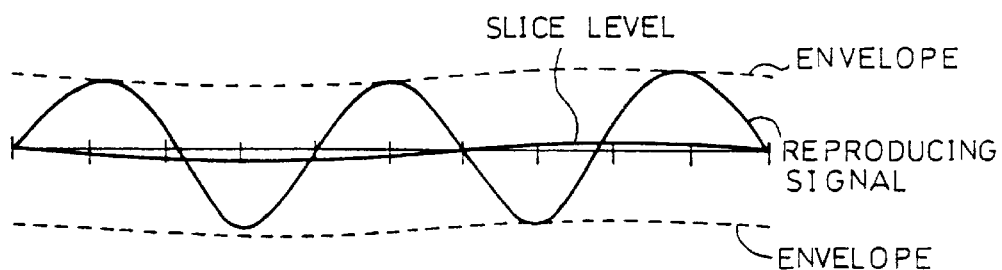
FIG. 9 is a waveform chart which shows a waveform of a reproducing signal in a conventional magneto-optical disk.

For comparison, one example of a reproducing signal obtained from a magneto-optical disk composed of a single magnetic layer which has been generally used is shown in FIG. 9. According to FIG. 9, since a recording magnetic domain in a spot of a light beam moves according to the movement of the light beam, a reproducing signal of like a sine curve can be obtained.

Generally, since the magneto-optical disk adopts the differential detecting method, the reproducing signal, in which the variation in amplitude of the signal due to variations in reflectance is suppressed to a certain degree, can be obtained. However, the variation in signal amplitude remains due to variation in birefringence, etc., that cannot be suppressed by the differential detection, and the reproducing signal shows a gentle up-down movement as shown in FIG. 9. In this case, when the fixed voltage level is set to the slice level, an accurate position of the recording magnetic domain cannot be detected in accordance with the gentle up-down movement of the signal amplitude.

Figure 10:
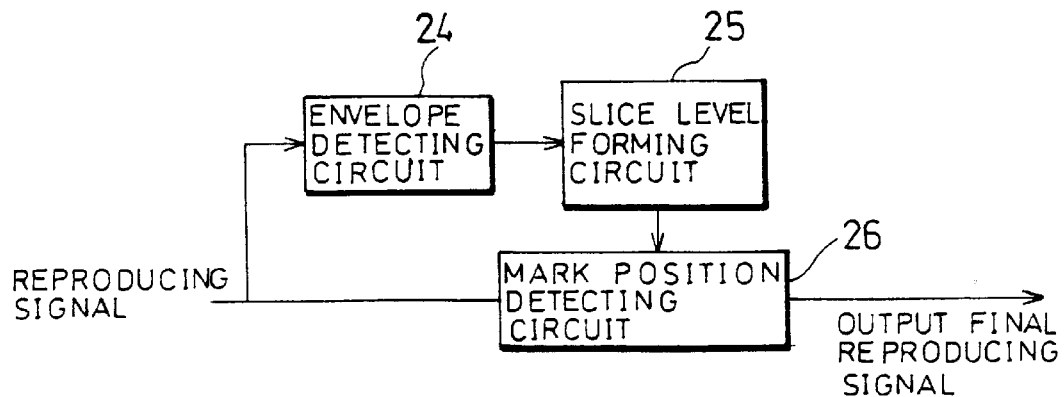
FIG. 10 is a block diagram which shows a constitution for compensating the waveform in the reproducing method from the conventional magneto-optical disk.

Therefore, in order to suppress the reproducing error due to the up-down movement, a final signal is generally obtained by envelope detection. Namely, as shown in FIG. 10, when an envelope of the reproducing signal is detected by an envelope detecting circuit 24, the slice level is set based upon an average level of the envelops by a slice level forming circuit 25. As a result, the variation in detecting position of the recording magnetic domain due to the gentle up-down movement can be suppressed, thereby detecting an accurate mark position by a mark position detecting circuit 26.

Also in the reproducing signal shown in FIG. 8 from the magneto-optical disk of the present embodiment, a gentle up-down movement of the signal amplitude can be seen, similarly to the conventional reproducing signal shown in FIG. 9. However, compared with the conventional reproducing signal, the rise and fall of the reproducing signal of the present embodiment are sharp. For this reason, in the case where the reproducing signal is sliced by the fixed voltage level, a position of the recording magnetic domain 4a can be detected more accurately than the case of the conventional reproducing signal. However, as in the method shown in FIG. 9, it is desirable that the final signal is obtained by detecting the envelope of the reproducing signal.

However, when the reproducing signal is processed by the envelope detection, it is required to delay the reproducing signal according to the delay due to the envelope detection. As a result, the circuit becomes complicated, and the troublesome task of synchronizing the slice level in the envelope detection with the reproducing signal is required.

Therefore, in the present embodiment, the final reproducing signal is obtained by differentiating the reproducing signal obtained from the magneto-optical disk. Since the reproducing signal shown in FIG. 8 obtained in the present embodiment has the characteristic that its rise and fall are extremely sharp, the gentle variation in the amplitude of the reproducing signal can be removed from the reproducing signal by the differentiation of the reproducing signal, as shown in FIG. 11, thereby making it possible to obtain only the portion subject to a sharp change in the reproducing signal, i.e. the rising and falling portion of the reproducing signal as a differentiated output.

Figure 12:
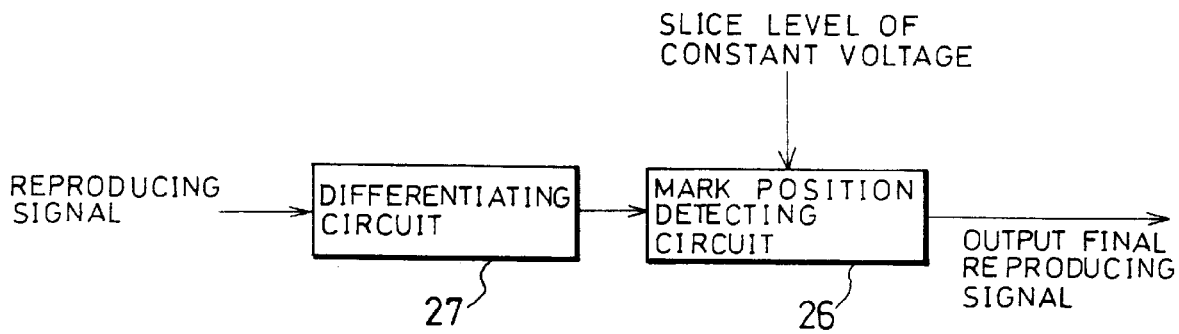
FIG. 12 is a block diagram which shows a constitution for compensating the waveform in the reproducing method from the magneto-optical disk of the present invention.

As described, according to the arrangement of the present embodiment, an adverse effect of a gentle up-down movement of the signal amplitude can be removed by differentiating the obtained reproducing signal, thereby obtaining a final reproducing signal indicating an accurate position of the recording magnetic domain 4a. Therefore, as shown in FIG. 12, a differentiating circuit 27 for differentiating a reproducing signal, and a mark position detecting circuit 26 for detecting a position where a differentiated output from the differentiating circuit 27 becomes not less than a fixed voltage slice level are provided. As a result, the conventional delay circuit can be omitted, and thus a reproducing signal can be accurately processed by a simple circuit configuration using the fixed voltage slice level.

Figure 11:
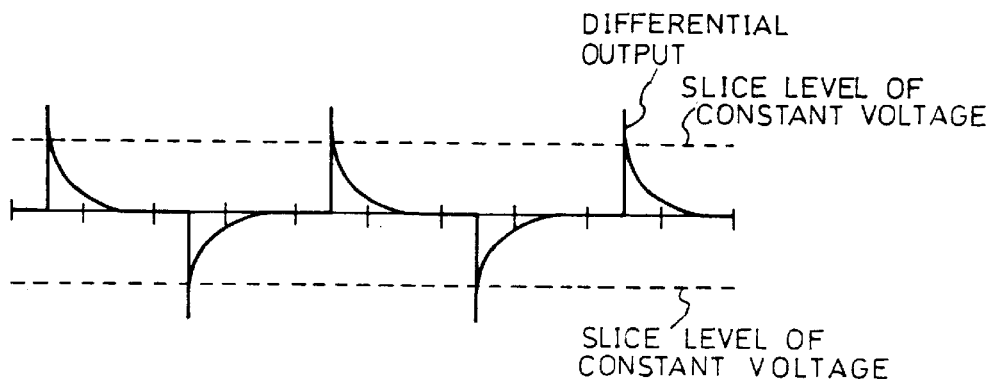
FIG. 11 is a waveform chart which shows a waveform obtained by differentiating the reproducing signal shown in FIG. 8.

As to the above-mentioned fixed voltage slice level, as shown in FIG. 11, for example, by setting two kinds of fixed voltage slice levels, the positions of the rise and fall of the reproducing signal can be detected accurately and separately. Moreover, by further differentiating the differentiated output shown in FIG. 11, the positions of the rise and fall of the reproducing signal can be detected accurately and simultaneously by one fixed voltage slice level.

As mentioned above, the gentle up-down movement of the signal amplitude of the obtained reproducing signal can be eliminated by differentiating the reproducing signal, and the final reproducing signal for detecting the accurate position of the recording magnetic domain 4a can be obtained from the reproducing signal. As a result, the CNR required for the reproducing signal may be set lower.

Namely, the signal having a quality of not more than 45 dB in CNR prior to signal processing cannot enable the error rate of not more than $1 \times 10^{-5}$ required for the magneto-optical disk. However, even the signal having a quality of about 35 dB prior to signal processing can realize the error rate required for the magneto-optical disk as the magneto-optical recording medium, thereby achieving recording-reproducing operation at higher density.

As shown in FIG. 9, in the case where the reproducing signal shows a sine curve, even if the reproducing signal is differentiated, only a phase of the reproducing signal is changed. Therefore, it is difficult to change the waveform of the reproducing signal.

Next, the examination data which enables such high density recording and reproducing are shown in Table 4. In the Table, the comparative example shows results of the conventional reproducing signal shown in FIG. 9, and the example shows results of the reproducing signal according to the present embodiment.

TABLE 4

| Bit length (μm) | Comparative Example | | Example | | |
|---|---|---|---|---|---|
| | CNR 1 (dB) | Er 1 ($\times 10^{-5}$) | CNR 2 (dB) | Er 2 ($\times 10^{-5}$) | Er 3 ($\times 10^{-5}$) |
| 0.8 | 48 | 0.3 | 43 | 0.2 | 0.1 |
| 0.6 | 45 | 0.4 | 43 | 0.2 | 0.1 |
| 0.5 | 43 | 1.3 | 43 | 0.3 | 0.2 |
| 0.4 | 39 | 5.4 | 42 | 0.3 | 0.2 |
| 0.35 | — | — | 41 | 0.6 | 0.4 |
| 0.3 | — | — | 35 | 1.0 | 0.8 |
| 0.25 | — | — | 30 | 13.0 | 4.8 |

As is clear from Table 4, in the CNR 1 as comparative example, only when the bit length is not less than 0.6 μm, as shown under the column of Er1, a desired error rate (not more than $1 \times 10^{-5}$) is obtained. On the other hand, in CNR 2 having the structure of the present embodiment, even if the reproducing signal is not differentiated, as shown under the column of Er 2, a desired error rate is obtained with a bit length of not less than 0.3 μm, thereby achieving higher recording density than that obtained by the conventional method. Moreover, when the reproducing signal is differentiated, as shown under the column of Er 3, a desired error rate can be obtained with a bit length of not less than 0.3 μm, and the error rate is generally lowered compared with the case that the reproducing signal is not differentiated.

[SECOND EMBODIMENT]

The following describes another embodiment of the present invention on reference to FIGS. 13 through 15, and FIGS. 3 through 6 for the first embodiment. Here, for convenience of explanation, those members that have the same arrangement and functions, and that are described in the aforementioned embodiment are indicated by the same reference numerals and the description thereof is omitted.

Figure 13:
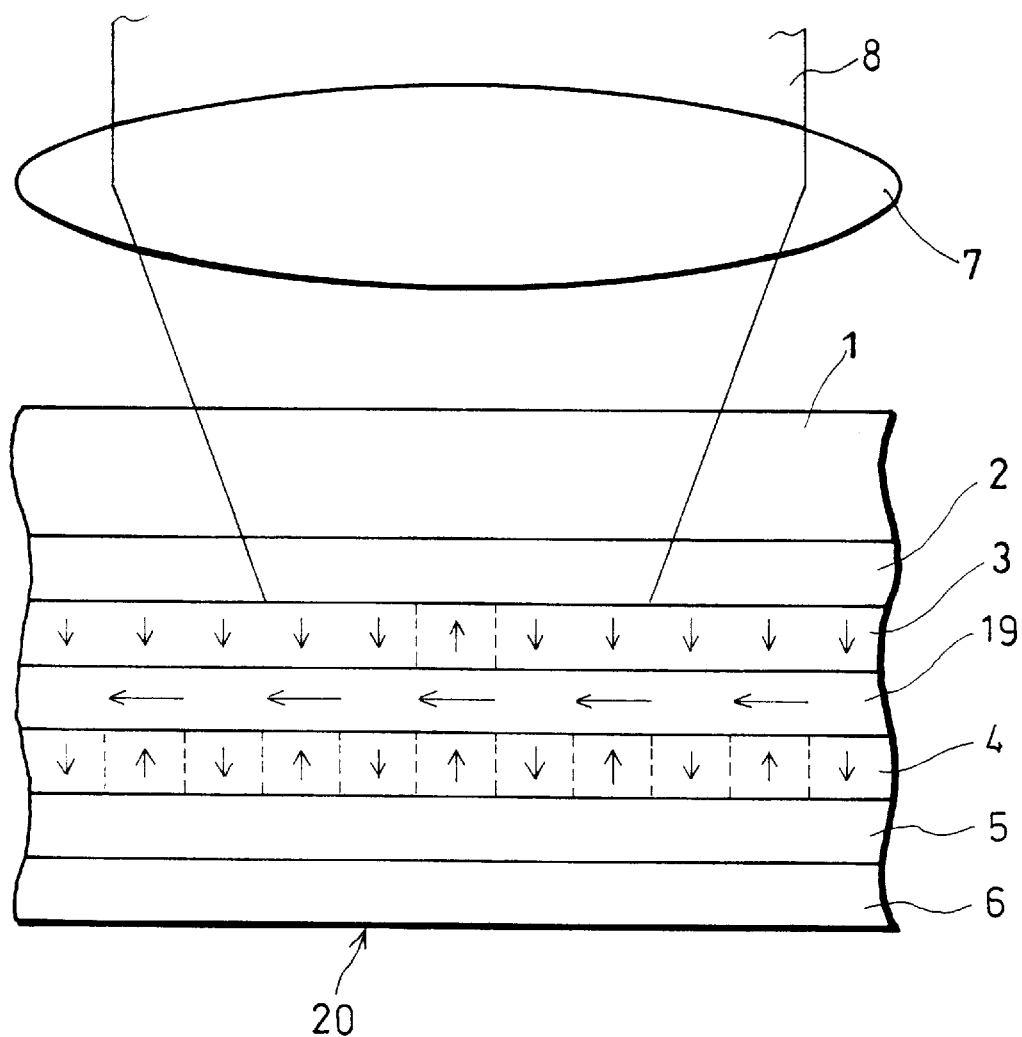
FIG. 13 is an explanatory drawing which shows an arrangement of the magneto-optical disk according to another embodiment of the present invention.

As shown in FIG. 13, the magneto-optical disk of the present embodiment has a disk main body 20 provided with an intermediate layer 19 made of an in-plane magnetization film, instead of the non-magnetic intermediate layer 9 of the first embodiment, and the other arrangement is the same as that in the first embodiment.

The intermediate layer 19 controls a magnetic exchange coupling force exerted between the recording layer 4 and the reproducing layer 3. As a result, since the magnetic exchange coupling force exerted between the recording layer 4 and the reproducing layer 3 are substantially weakened, the magnetization direction of the reproducing layer 3 is controlled by the leakage magnetic flux generated from the recording layer 4 and the external magnetic field applied from outside.

In the case of the reproduction from the magneto-optical disk, similarly to the magneto-optical disk of the first embodiment, it is required to arrange the magnetization direction of the reproducing layer 3 and the magnetization direction of the non-recorded portion of the recording layer 4 in the direction of the external magnetic field in the first temperature range $T_1$ and the third temperature range $T_3$.

Therefore, similarly to the first embodiment, the external magnetic field is set so that a temperature dependency of the strength of the leakage magnetic flux generated from the recording layer 4, and a relationship between the leakage magnetic flux strength and the fixed strength of the external magnetic field which is applied from the outside become the same as those shown in FIG. 3. Then, the external magnetic field is applied to the magneto-optical disk.

Figure 15A:
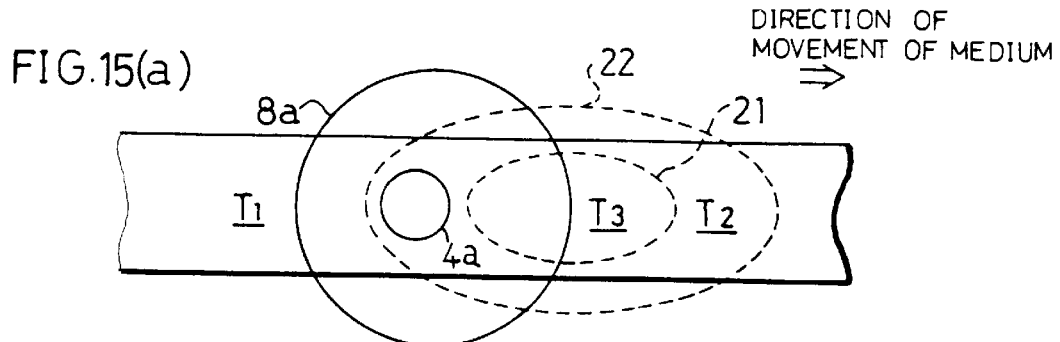
FIG. 15(a) is an explanatory drawing which shows a principle of reproduction from the magneto-optical disk in FIG. 13 and a temperature distribution on a track.
Figure 15B:
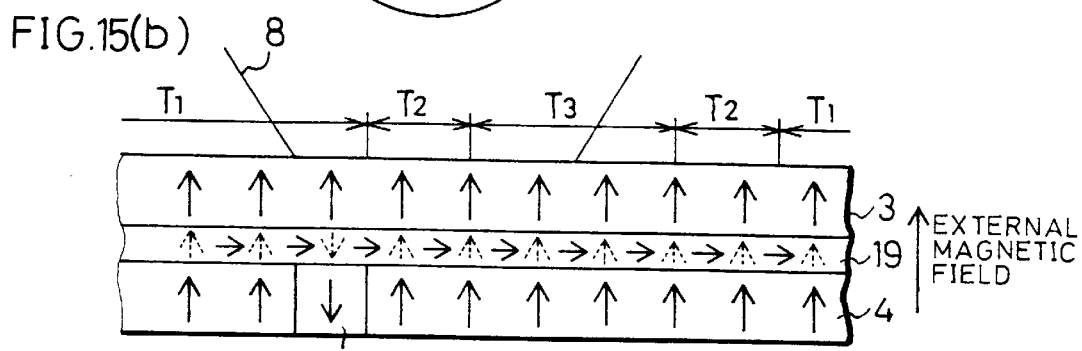
FIG. 15(b) is a cross sectional view which shows a magnetization state when a recording magnetic domain falls in a first temperature range.
Figure 15C:
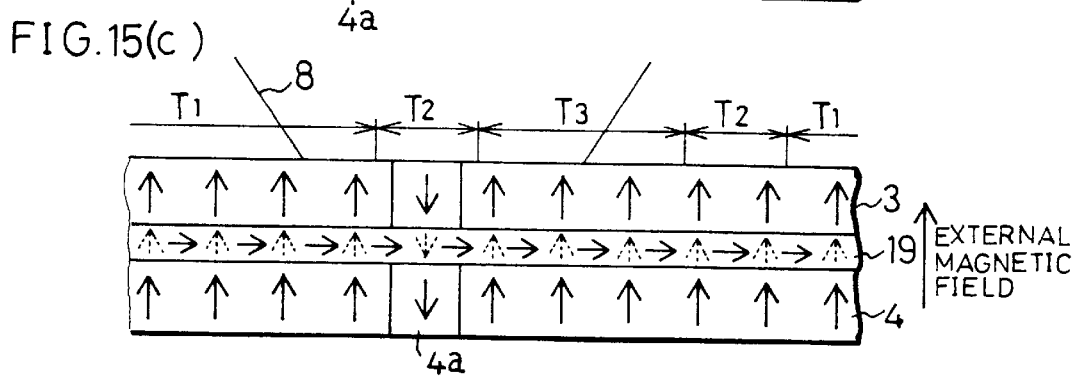
FIG. 15(c) is a cross sectional view which shows the magnetization state when the recording magnetic domain falls in a second temperature range.
Figure 15D:
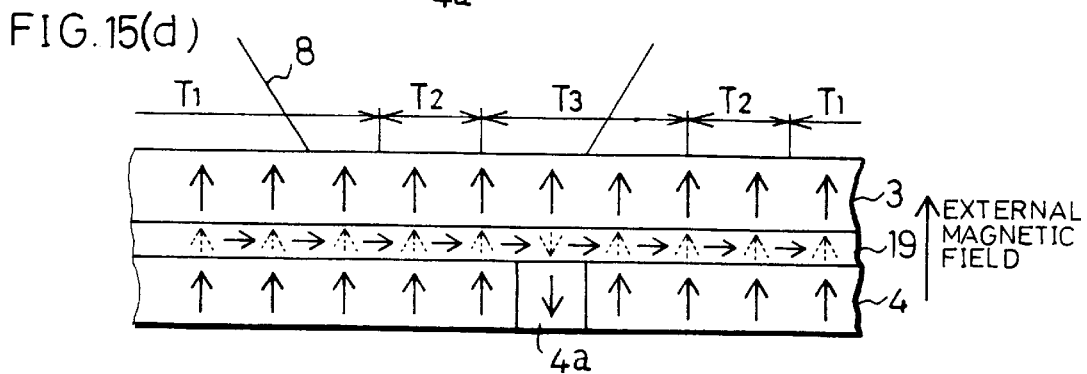
FIG. 15(d) is a cross sectional view which shows the magnetization state when the recording magnetic domain falls in a third temperature range.
Figure 16:
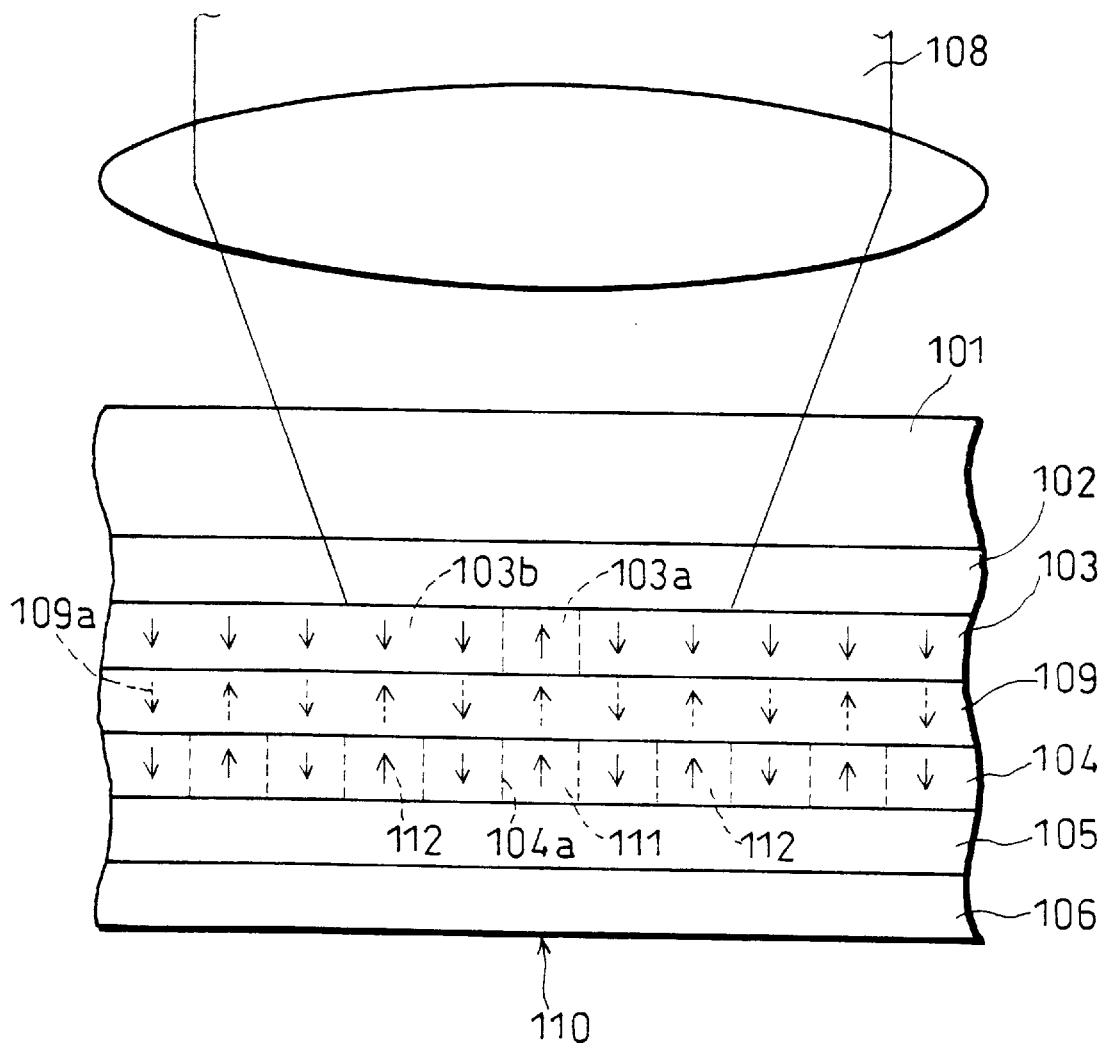
FIG. 16 is an explanatory drawing which shows an arrangement of a conventional magneto-optical disk.

The following describes the reproducing operation on the magneto-optical disk in reference to FIGS. 15(a) through 15(d). FIG. 15(a) is a plan view of the magneto-optical disk, and here, it shows only one recording magnetic domain 4a which is transferred to the reproducing layer 3 when the reproduction can be performed on the reproducing layer 3. FIGS. 15(b) through 15(d) show magnetization state of each layer and a state of the leakage magnetic flux. The state that the recording magnetic domain 4a is transferred to the reproducing layer 3 in the first through third temperature ranges $T_1$ through $T_3$ is the same as that in the first embodiment.

As mentioned above, the magnetic exchange coupling force exerted between the reproducing layer 3 and the recording layer 4 can be weaken by providing the intermediate layer 19, and thus only one portion of the recording magnetic domain 4a where the temperature rises due to the light beam 8 is transferred to the reproducing layer 3 and reproduced therefrom by a magnetostatic coupling force exerted between the leakage magnetic flux generated from the recording layer 4 and the magnetization of the reproducing layer 3. Namely, the superresolution reproducing operation can be achieved.

In addition, the waveform of the reproducing signal is such that the rise and fall are sharp similarly to the first embodiment.

Figure 14:
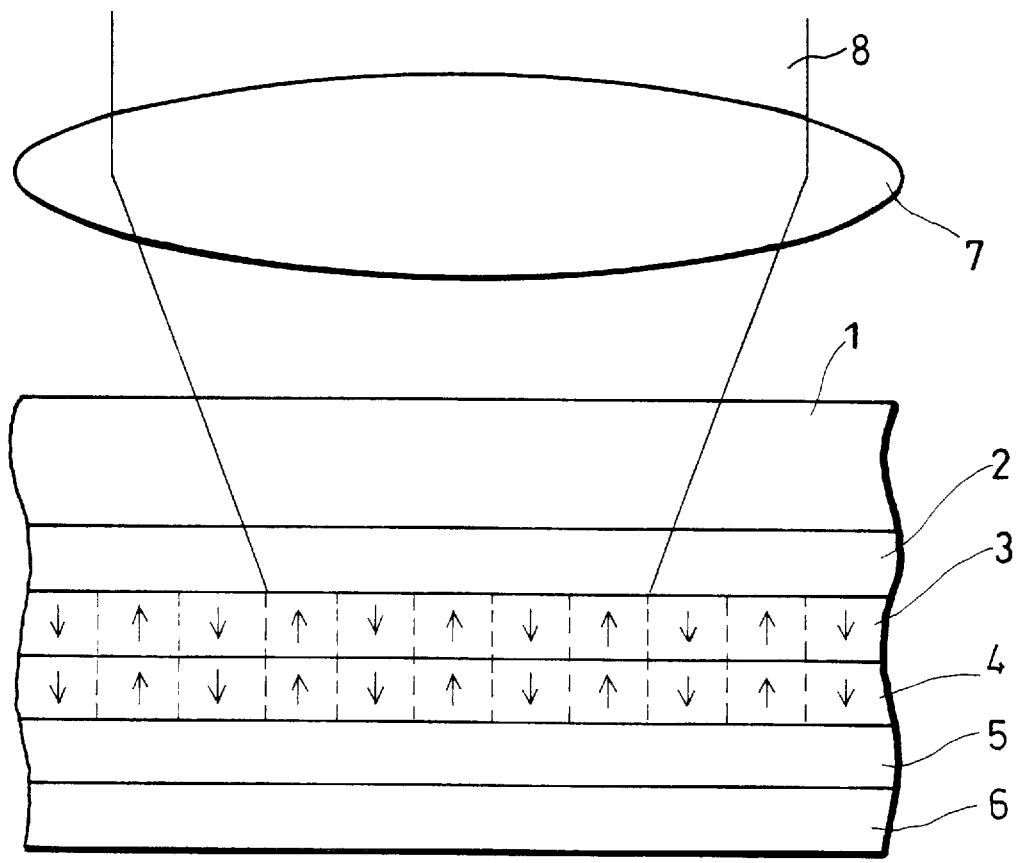
FIG. 14 is an explanatory drawing which shows an arrangement of the conventional magneto-optical disk.

As shown in FIG. 14, in the case where the intermediate layer 19 is not provided, the strong magnetic exchange coupling force is exerted between the reproducing layer 3 and the recording layer 4 by the contact therebetween. For this reason, all the recording magnetic domains of the recording layer 4 are transferred to the reproducing layer 3. As a result, the superresolution operation is not realized.

A method of manufacturing the magneto-optical disk having the above arrangement will be explained. A magneto-optical disk manufactured by this method is referred to as a disk B.

First, in the sputtering device provided with targets of Al, first and second GdFeCo alloy targets and DyFeCo alloy target, the substrate 1 formed in a disk shape made of polycarbonate having pregroove and prepit was located on the substrate holder. Similarly to the first embodiment, after air was exhausted from the sputtering device to $1\times10^{-6}$ Torr, mixed gas of argon and nitrogen was introduced into the sputtering device, and an electric power is supplied to the Al target. Then, under the gas pressure of $4\times10^{-3}$ Torr, the transparent dielectric layer 2 made of AlN having a thickness of 50 nm was formed on the substrate 1.

Next, again, after air was exhausted from the sputtering device to $1\times10^{-6}$ Torr, argon gas was introduced therein. Then, an electric power was supplied to the first GdFeCo alloy target, and under the gas pressure of $4\times10^{-3}$ Torr, the reproducing layer 3 made of $Gd_{0.20}(Fe_{0.80}Co_{0.20})_{0.80}$ was formed on the transparent dielectric layer 2. Similarly to the first embodiment, the compensation temperature of the reproducing layer 3 was in a vicinity of room temperature and Curie temperature thereof was 280° C. Moreover, the reproducing layer 3 having a thickness of 40 nm was adopted.

Next, an electric power was supplied to the second GdFeCo alloy target, and under the gas pressure of $4\times10^{-3}$ Torr, the intermediate layer 19 made of $Gd_{0.10}(Fe_{0.80}Co_{0.20})_{0.90}$ was formed on the reproducing layer 3. It is desirable that the intermediate layer 19 has a thickness of not more than 60 nm in order to effectively transmit the leakage magnetic flux generated from the recording layer 4 to the reproducing layer 3. Moreover, it is preferable that the intermediate layer 19 has a thickness of not less than 5 nm in order to sufficiently weaken the magnetic exchange coupling force exerted between the reproducing layer 3 and the recording layer 4. In the present embodiment, the intermediate layer 19 having a thickness of 20 nm was adopted.

Next, an electric power was supplied to the DyFeCo alloy target, and under the gas pressure of $4\times10^{-3}$ Torr, the recording layer 4 made of $Dy_{0.23}(Fe_{0.70}Co_{0.30})_{0.77}$ was formed on the intermediate layer 19. Similarly to the first embodiment, the recording layer 4 is composed of a magnetic thin film with perpendicular magnetization, and a compensation temperature thereof was in a vicinity of room temperature and Curie temperature thereof was 275° C. Moreover, the recording layer 4 having a thickness of 40 nm was adopted.

Similarly to the first embodiment, mixed gas of argon and nitrogen was introduced into the sputtering device, and an electric power was supplied to the Al target. Then, the protective layer 5 made of AlN was formed on the recording layer 4 under the same condition as the forming condition of the transparent dielectric layer 2.

In addition, the ultraviolet ray hardening resin or a thermosetting resin was applied to the protective layer 5 by spin-coating, and the ultraviolet ray was projected or heat was applied thereto so that the overcoat layer 6 was formed on the protective layer 5.

A mark length dependency of the CNR in the disk B was measured in the same manner as the disk A of the first embodiment. The external magnetic field of 8 kA/m was applied to the disk B, and the CNR was measured using the reproducing laser power of 1.5 mW. Except for this condition, the measurement was taken under the same conditions as the first embodiment.

As shown in FIG. 4, with respect to the mark length dependency of the CNR in the disk B, the result which is similar to the disk A was obtained. Namely, the CNR of not less than 40 dB was obtained with respective to the recording magnetic domain 4a having a mark length of 0.3 μm and a mark pitch of 0.6 μm.

In addition, in the disk B, the waveform of the reproducing signal obtained from the recording magnetic domain having a mark length of 0.3 μm and a mark pitch of 0.6 μm shows the sharp rise and fall, which are the same characteristic of the reproducing signal in the disk A shown in FIG. 5. This is because the temperature distribution of FIG. 15 is shown according to the rise in the reproducing power similarly to the case of the disk A, and the reproducing magnetic domain is instantaneously generated and collapsed on the reproducing layer 3, thereby obtaining the reproducing waveform having the sharp rise and fall.

Next, in order to examine the dependency on the reproducing power of the CNR, with varying the reproducing power of the laser beam, the CNR was measured for the recording magnetic domain 4a having a mark length of 0.3 μm and a mark pitch of 0.6 μm. The results are shown in FIG. 6.

According to FIG. 6, when the reproducing power is about 1.0 mW, the CNR was abruptly increased. This is because the temperature distribution of the reproducing layer 3 shown in FIG. 15 is shown according to the rise in the reproducing power, and the reproducing magnetic domain is instantaneously generated and collapsed on the reproducing layer 3, thereby raising the CNR abruptly.

Compared with the disk A, the disk B realizes the more abrupt rise in the CNR by using the less reproducing power. This is because the interaction between the reproducing layer 3 and the recording layer 4 varies depending on whether the non-magnetic film is used or the in-plane magnetic film is used as the intermediate layer.

When the reproducing power is further increased, the CNR is abruptly lowered. This is because the temperature of the recording layer 4 rises to the vicinity of its Curie temperature, and thus the magnetization information recorded on the recording layer 4 is changed.

Therefore, the reproducing power required for the magneto-optical disk of the present embodiment is set higher than a power required for generating and collapsing the reproducing magnetic domain, and smaller than a power which makes it impossible to transfer the recording magnetic domain 4a satisfactorily similarly to embodiment 1. With the above-mentioned setting of the reproducing power, a signal can be reproduced satisfactorily.

Next, with varying the thicknesses of the reproducing layer 3, the intermediate layer 19 and the recording layer 4, the CNRs with respect to the recording magnetic domain 4a having a mark length of 0.3 μm and a mark pitch of 0.6 μm were measured. The results are shown in Table 5.

TABLE 5

| Thickness of Reproducing layer (nm) | Thickness of Intermediate Layer (nm) | Thickness of Recording Layer (nm) | CNR (dB) | Reproducing Characteristic |
| --- | --- | --- | --- | --- |
| 5 | 20 | 40 | 12 | ◯ |
| 10 | 20 | 40 | 33 | ◯ |
| 20 | 20 | 40 | 37 | ◯ |
| 30 | 20 | 40 | 40 | ◯ |
| 40 | 20 | 40 | 41 | ◯ |
| 50 | 20 | 40 | 41 | ◯ |
| 60 | 20 | 40 | 40 | ◯ |
| 40 | 2 | 40 | — | — |
| 40 | 5 | 40 | — | — |
| 40 | 10 | 40 | 30 | ◯ |

TABLE 5-continued

| Thickness of Reproducing layer (nm) | Thickness of Intermediate Layer (nm) | Thickness of Recording Layer (nm) | CNR (dB) | Reproducing Characteristic |
|---|---|---|---|---|
| 40 | 20 | 40 | 41 | ◯ |
| 40 | 30 | 40 | 40 | ◯ |
| 40 | 40 | 40 | 40 | ◯ |
| 40 | 60 | 40 | 39 | ◯ |
| 40 | 20 | 5 | 19 | ◯ |
| 40 | 20 | 10 | 26 | ◯ |
| 40 | 20 | 20 | 38 | ◯ |
| 40 | 20 | 30 | 40 | ◯ |
| 40 | 20 | 40 | 41 | ◯ |
| 40 | 20 | 60 | 41 | ◯ |
| 40 | 20 | 80 | 41 | ◯ |
| 40 | 20 | 120 | 39 | ◯ |

As is clear from the results in Table 5, some value for the CNR was obtained with respect to the recording magnetic domain 4a having a mark length of 0.3 μm and a mark pitch of 0.6 μm. This proves that the magnetic superresolution phenomenon is shown by the arrangement of the present invention as mentioned above.

In Table 5, the magneto-optical disks from which the rectangular reproducing waveforms which are similar to the reproducing waveform shown in FIG. 5 are obtained are marked "O" under the column of the reproducing characteristic.

As a result, in the case where the intermediate layer 19 has an extremely thin thickness of 2 nm and 5 nm, the magnetic superresolution operation is not confirmed, but in the other range of thicknesses, the magnetic superresolution operation is confirmed. In the case where the intermediate layer 19 has an extremely thin thickness, since the exchange coupling force exerted between the recording layer 4 and the reproducing layer 3 becomes strong, the recording magnetic domain 4a is transferred to the reproducing layer 3 in the first temperature range $T_1$ and the third temperature range $T_3$, thereby making it impossible to realize the superresolution operation.

As a result, when the reproducing layer 3 has a thickness in the range of 5 nm to 60 nm, the excellent reproducing characteristic is obtained, but it is preferable that the reproducing layer 3 has a thickness in the range of 10 nm to 50 nm for the reason mentioned in the first embodiment. Moreover, when it is considered that the CNR becomes not less than 40 dB, it is more preferable that the reproducing layer 3 has a thickness in the range of 30 nm to 50 nm. It is preferable that the intermediate layer 19 has a thickness in the range of 10 nm to 60 nm, and more preferable that it has a thickness in the range of 20 nm to 40 nm so that the CNR thereof becomes not less than 40 dB. Furthermore, it is preferable that the recording layer 4 has a thickness in the range of 5 nm to 120 nm, and more preferable that it has a thickness in the range of 30 nm to 80 nm so that the CNR thereof becomes not less than 40 dB.

Next, with varying the composition of the intermediate layer 19, the CNRs with respec to the recording magnetic domain 4a having a mark length of 0.3 μm and a mark pitch of 0.6 μm were measured, and the results are shown in Table 6. In Table 6, $X_3$ and $Y_3$ represent a composition ratio of $Gd_{X3}(Fe_{Y3} Co_{1-Y3})_{1-X3}$ in the intermediate layer 19.

TABLE 6

| $X_3$ | $Y_3$ | CNR (dB) | Reproducing Characteristic |
|---|---|---|---|
| 0.00 | 0.80 | 38.0 | ◯ |
| 0.05 | 0.80 | 39.2 | ◯ |
| 0.10 | 0.80 | 41.0 | ◯ |
| 0.12 | 0.80 | 28.2 | ◯ |
| 0.14 | 0.80 | 0 | — |
| 0.10 | 0.40 | 0 | — |
| 0.10 | 0.55 | 22.5 | ◯ |
| 0.10 | 0.63 | 35.5 | ◯ |
| 0.10 | 0.80 | 41.0 | ◯ |
| 0.10 | 0.85 | 38.9 | ◯ |
| 0.10 | 1.00 | 37.2 | ◯ |

In addition, in Table 6, the magneto-optical disks from which the rectangular reproducing waveforms which are similar to the reproducing waveform shown in FIG. 5 are obtained are marked "O" under the column of reproducing characteristic.

According to Table 6, in the present invention, $Gd_{X3}(Fe_{Y3} Co_{1-Y3})_{1-X3}$ of the intermediate layer 19 is required to satisfy the following condition: With a given $Y_3=0.80$, $X_3 \leq 0.12$. When $X_3$ becomes larger than 0.12, the intermediate layer 19 becomes a magnetic thin film with perpendicular magnetization. As a result, the exchange coupling force exerted between the recording layer 4 and the reproducing layer 3 becomes strong, thereby making it impossible to achieve the superresolution operation of the present invention. Moreover, $Gd_{X3}(Fe_{Y3} Co_{1-Y3})_{1-X3}$ of the intermediate layer 19 is required to satisfy the following condition: With a given $X_3=0.10$, $0.55 \leq Y_3$. In the range of $Y_3 < 0.55$, content of Co is increased, and the magnetization of the intermediate layer 19 becomes large. As a result, the exchange coupling force exerted between the recording layer 4 and the reproducing layer 3 becomes strong, thereby making it impossible to realize the superresolution operation.

Since the process of the reproducing signal of the magneto-optical disk in the present embodiment is same as that in the first embodiment, the description thereof is omitted.

In the first and second embodiments, the transparent dielectric layer 2 made of AlN is adopted, but a transparent dielectric layer made of SiN, MgO, SiO, TaO, etc. may be used. However, since the rare earth-transition metal alloy thin film composing the reproducing layer 3 and the recording layer 4 is easily oxidized, it is preferable that AlN or SiN which does not contain oxygen is used as a transparent dielectric layer.

In addition, the reproducing layer 3 made of GdFeCo alloy is adopted, but other materials may be used in the reproducing layer 3 as long as the magnetization is arranged in the direction of the external magnetic field in the first and third temperature ranges $T_1$ and $T_3$ and is arranged in the direction of the leakage magnetic flux generated from the recording layer 4 in the second temperature range $T_2$. Therefore, besides the GdFeCo alloy, for example, the rare earth-transition metal alloy thin film made of GdFe alloy, GdDyFe alloy, GdDyFeCo alloy, etc. may be used.

In addition, in the first embodiment, the non-magnetic intermediate layer 9 made of AlN is adopted, but the effect of the present invention can be achieved as long as a non-magnetic material is used. Examples of such materials other than AlN include: a metal such as Al, Si, Ta and Ti, and a dielectric member such as SiN, SiO and TaO.

It is also preferable that the non-magnetic intermediate layer 9 made of a metal which does not contain oxygen, such as Al, Si, Ta and Ti, or SiN or AlN as in the case of the transparent dielectric layer 2. Moreover, in the case of adopting AlN for the transparent dielectric layer 2, by adopting Al or AlN for the non-magnetic intermediate layer 9, and in the case of adopting SiN for the transparent dielectric layer 2, by adopting Si or SiN for the non-magnetic intermediate layer 9, the effect of eliminating a new sputtering target required for forming the non-magnetic intermediate layer 9 can be achieved.

In addition, in the second embodiment, the intermediate layer 19 made of GdFeCo alloy is adopted, but other materials may be used as long as the exchange coupling force exerted between the recording layer 4 and the reproducing layer 3 can have the approximately same strength as the magnetostatic coupling force exerted therebetween. Therefore, it is possible to use an in-plane magnetization film made of for example, GdFe alloy, FeCo alloy, Fe, Co, etc. other than GdFeCo alloy.

In addition, in the first and second embodiments, the recording layer 4 made of DyFeCo alloy was adopted, but in accordance with the present invention, other materials can be used as long as the leakage magnetic flux which is required for reversing the magnetization of the reproducing layer 3 in reproducing, can be generated. Therefore, a rare earth-transition metal alloy thin film made of TbFeCo alloy, TbDyFeCo alloy, GdTbFeCo alloy, etc. other than DyFeCo alloy can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium formed on a substrate, comprising:
   a recording layer composed of a magnetic thin film with perpendicular magnetization, on which information is recorded in the perpendicular magnetization direction, said recording layer for generating a leakage magnetic flux;
   a reproducing layer composed of a magnetic thin film with perpendicular magnetization, to which information about a magnetic domain of said recording layer is transferred, said reproducing layer being formed so that when an external magnetic field is applied to the reproducing layer in reproducing information, magnetization direction of the reproducing layer is arranged in the direction of the external magnetic field in a first temperature range including room temperature, and the magnetization direction is arranged in the direction of the leakage magnetic flux in a second temperature range which includes the highest temperature in the first temperature range by projecting a light beam thereto, and the magnetization direction is again arranged in the direction of the external magnetic field in a third temperature range which includes the highest temperature in the second temperature range; and
   an intermediate layer composed of a non-magnetic film, said intermediate layer being formed between said recording layer and said reproducing layer, said intermediate layer for intercepting a magnetic exchange coupling force exerted between said recording layer and said reproducing layer.

2. The magneto-optical recording medium as defined in claim 1, wherein the magnetization of said recording layer becomes small in a vicinity of room temperature, and after the magnetization becomes large according to a rise of the temperature so as to have the maximum value, it is decreased and becomes zero at a Curie temperature of said recording layer.

3. The magneto-optical recording medium as defined in claim 1, wherein the magnetization of said reproducing layer takes the maximum value in the second temperature range.

4. The magneto-optical recording medium as defined in claim 1, wherein the following relationship is satisfied:

$$T_1 < \frac{Tc}{3} \leq T_2 \leq \frac{2}{3} Tc < T_3$$

where the first, second and third temperature ranges are respectively $T_1$, $T_2$ and $T_3$, and the Curie temperature of said recording layer is Tc.

5. The magneto-optical recording medium as defined in claim 1, wherein said reproducing layer has a thickness of 10 nm to 50 nm, and said non-magnetic intermediate layer has a thickness of 1 nm to 60 nm and said recording layer has a thickness of 20 nm to 200 nm.

6. The magneto-optical recording medium as defined in claim 1, wherein said reproducing layer has a thickness of 30 nm to 40 nm, and said non-magnetic intermediate layer has a thickness of 2 nm to 10 nm, and said recording layer has a thickness of 40 nm to 120 nm.

7. The magneto-optical recording medium as defined in claim 1, wherein when composition of said reproducing layer is $Gd_{X1}(Fe_{Y1} Co_{1-Y1})_{1-X1}$, the following relationship is satisfied: With a given $Y_1=0.80$, $0.16 \leq X_1 \leq 0.22$, and with a given $X_1=0.20$, $0.74 \leq Y_1 \leq 1.00$.

8. The magneto-optical recording medium as defined in claim 1, wherein when composition of said recording layer is $Dy_{X2}(Fe_{Y2} Co_{1-Y2})_{1-X2}$, the following relationship is satisfied: with a given $Y_2=0.70$, $0.18 \leq X_2 \leq 0.25$, and with a given $X_2=0.23$, $0.66 \leq Y_2 \leq 0.85$.

9. A magneto-optical recording medium formed on a substrate, comprising:
   a recording layer composed of a magnetic thin film with perpendicular magnetization on which information is recorded in the perpendicular magnetization direction, said recording layer for generating a leakage magnetic flux;
   a reproducing layer composed of a magnetic thin film with perpendicular magnetization to which information about a magnetic domain of said recording layer is transferred, said reproducing layer being formed so that when an external magnetic field is applied to the reproducing layer in reproducing information, magnetization direction of the reproducing layer is arranged in the direction of the external magnetic field in a first temperature range including room temperature, and the magnetization direction is arranged in the direction of the leakage magnetic flux in a second temperature range which includes the highest temperature in the first temperature range by projecting a light beam thereto, and the magnetization direction is again arranged in the direction of the external magnetic field in a third temperature range which includes the highest temperature in the second temperature range; and
   an intermediate layer composed of an in-plane magnetization film, said intermediate layer being provided between said recording layer and said reproducing layer, said intermediate layer for controlling a magnetic exchange coupling force exerted between said recording layer and said reproducing layer.

10. The magneto-optical recording medium as defined in claim 9, wherein the magnetization of said reproducing layer takes the maximum value in the second temperature range.

11. The magneto-optical recording medium as defined in claim 9, wherein the magnetization of said recording layer becomes small in a vicinity of room temperature, and after the magnetization becomes large according to a rise of the temperature so as to have the maximum value, it is decreased and becomes zero at a Curie temperature of said recording layer.

12. The magneto-optical recording medium as defined in claim 9, wherein the following relationship is satisfied:

$$T_1 < \frac{Tc}{3} \leq T_2 \leq \frac{2}{3} Tc < T_3$$

where the first, second and third temperature ranges are respectively $T_1$, $T_2$ and $T_3$, and the Curie temperature of said recording layer is Tc.

13. The magneto-optical recording medium as defined in claim 9, wherein said reproducing layer has a thickness of 10 nm to 50 nm, and said intermediate layer has a thickness of 5 nm to 60 nm and said recording layer has a thickness of 20 nm to 200 nm.

14. The magneto-optical recording medium as defined in claim 9, wherein said reproducing layer has a thickness of 30 nm to 50 nm, and said intermediate layer has a thickness of 20 nm to 40 nm, and said recording layer has a thickness of 30 nm to 80 nm.

15. The magneto-optical recording medium as defined in claim 9, wherein when composition of said intermediate layer is $Gd_{X3}(Fe_{Y3}CO_{1-Y3})_{1-X3}$ the following relationship is satisfied: With a given $Y_3=0.80$, $X_3 \leq 0.12$, and with a given $X_3=0.10$, $0.55 \leq Y_3$.

16. A magneto-optical recording medium formed on a substrate, comprising:

a recording layer composed of a magnetic thin film with perpendicular magnetization, on which information is recorded in the perpendicular magnetization direction, said recording layer for generating a leakage magnetic flux;

a reproducing layer composed of a magnetic thin film with perpendicular magnetization, to which information about a magnetic domain of said recording layer is transferred, said reproducing layer being formed so that when an external magnetic field is applied to the reproducing layer in reproducing information, magnetization direction is arranged in the leakage magnetic flux in a second temperature range which includes the highest temperature in a first temperature range including room temperature by projecting a light beam thereto, and the magnetization direction is arranged in the direction of the external magnetic field in a third temperature range which includes the highest temperature in the second temperature range; and an intermediate layer composed of a non-magnetic film, said intermediate layer being formed between said recording layer and said reproducing layer, said intermediate layer for intercepting a magnetic exchange coupling force exerted between said recording layer and said reproducing layer.

17. A magneto-optical recording medium formed on a substrate, comprising:

a recording layer composed of a magnetic thin film with perpendicular magnetization, on which information is recorded in the perpendicular magnetization direction, said recording layer for generating a leakage magnetic flux;

a reproducing layer composed of a magnetic thin film with perpendicular magnetization, to which information about a magnetic domain of said recording layer is transferred, said reproducing layer being formed so that when an external magnetic field is applied to the reproducing layer in reproducing information, magnetization direction is arranged in the leakage magnetic flux in a second temperature range which includes the highest temperature in a first temperature range including room temperature by projecting a light beam thereto, and the magnetization direction is arranged in the direction of the external field in a third temperature range which includes the highest temperature in the second temperature range; and an intermediate layer composed of an in-plane magnetization film, said intermediate layer being formed between said recording layer and said reproducing layer, said intermediate layer for controlling a magnetic exchange coupling force exerted between said recording layer and said reproducing layer.

* * * * *